(12) United States Patent
Mok et al.

(10) Patent No.: US 9,986,410 B2
(45) Date of Patent: May 29, 2018

(54) TERMINAL AND DISTANCE ESTIMATION METHOD THEREOF

(71) Applicant: Samsung Electronics Co., Ltd., Suwon-si, Gyeonggi-do (KR)

(72) Inventors: Youngjoong Mok, Suwon-si (KR); Youngbin Chang, Anyang-si (KR); Sangwook Kwon, Yongin-si (KR); Jonghyung Kwun, Seoul (KR); Kyungkyu Kim, Suwon-si (KR); Hyunseok Ryu, Yongin-si (KR); Sangkyu Baek, Yongin-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/933,390

(22) Filed: Nov. 5, 2015

(65) Prior Publication Data

US 2016/0135178 A1 May 12, 2016

Related U.S. Application Data

(60) Provisional application No. 62/076,156, filed on Nov. 6, 2014.

(30) Foreign Application Priority Data

Mar. 31, 2015 (KR) .......................... 10-2015-0045716
Sep. 1, 2015 (KR) .......................... 10-2015-0123697

(51) Int. Cl.
*H04W 8/00* (2009.01)
*H04W 4/70* (2018.01)
(Continued)

(52) U.S. Cl.
CPC ............ *H04W 8/005* (2013.01); *H04W 4/023* (2013.01); *H04W 76/14* (2018.02); *H04W 4/70* (2018.02)

(58) Field of Classification Search
CPC ...... H04W 64/00; H04W 8/005; H04W 4/008; H04W 84/18; H04W 4/005; H04W 4/023;
(Continued)

(56) References Cited

U.S. PATENT DOCUMENTS

2006/0049976 A1* 3/2006 McFarland ........... G01S 5/0289
342/118
2014/0082205 A1* 3/2014 Abraham ............ H04L 65/1069
709/227

(Continued)

FOREIGN PATENT DOCUMENTS

EP       2 665 325 A1    11/2013
EP        2900022 A1      7/2015
WO     2015/138083 A1     9/2015

*Primary Examiner* — Daniel Lai
(74) *Attorney, Agent, or Firm* — Jefferson IP Law, LLP

(57) ABSTRACT

A terminal and a distance estimation method thereof for use in a wireless communication system supporting device-to-device (D2D) communication are provided. The terminal includes a transceiver configured to communicate with other terminals and at least one processor configured to control the transceiver to transmit a discovery message including time information to the other terminals and receive distance information calculated by the other terminals, the distance information being calculated based on the time information. The present disclosure relates to a pre-5th-Generation (5G) or 5G communication system to be provided for supporting higher data rates Beyond 4th-Generation (4G) communication system, such as Long Term Evolution (LTE).

14 Claims, 33 Drawing Sheets

(51) Int. Cl.
*H04W 76/14* (2018.01)
*H04W 4/02* (2018.01)

(58) Field of Classification Search
CPC ....... H04W 4/70; H04W 76/14; H04W 76/23;
G01S 5/0289; G01S 5/0226; G01S 11/08
See application file for complete search history.

(56) References Cited

U.S. PATENT DOCUMENTS

| | | |
|---|---|---|
| 2014/0112162 A1 | 4/2014 | Tavildar et al. |
| 2014/0293809 A1* | 10/2014 | Kim .................. H04W 76/023 370/252 |
| 2015/0005011 A1* | 1/2015 | Nehrenz ................. H04W 4/02 455/456.3 |
| 2015/0018017 A1* | 1/2015 | Jang ..................... G01S 5/0284 455/456.5 |
| 2015/0099511 A1 | 4/2015 | Lindoff et al. |
| 2015/0215883 A1 | 7/2015 | Zheng et al. |
| 2015/0264677 A1 | 9/2015 | He et al. |

\* cited by examiner

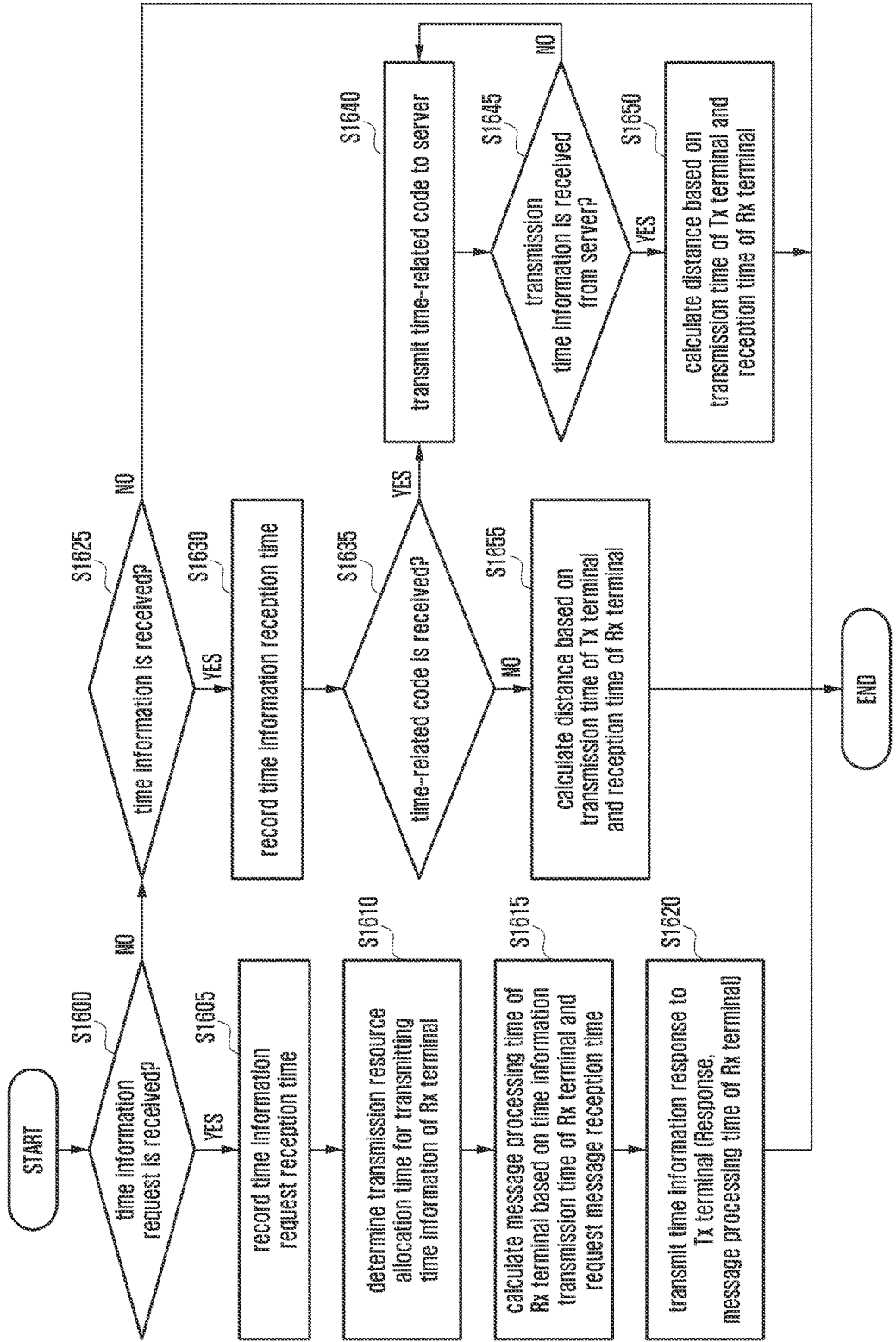

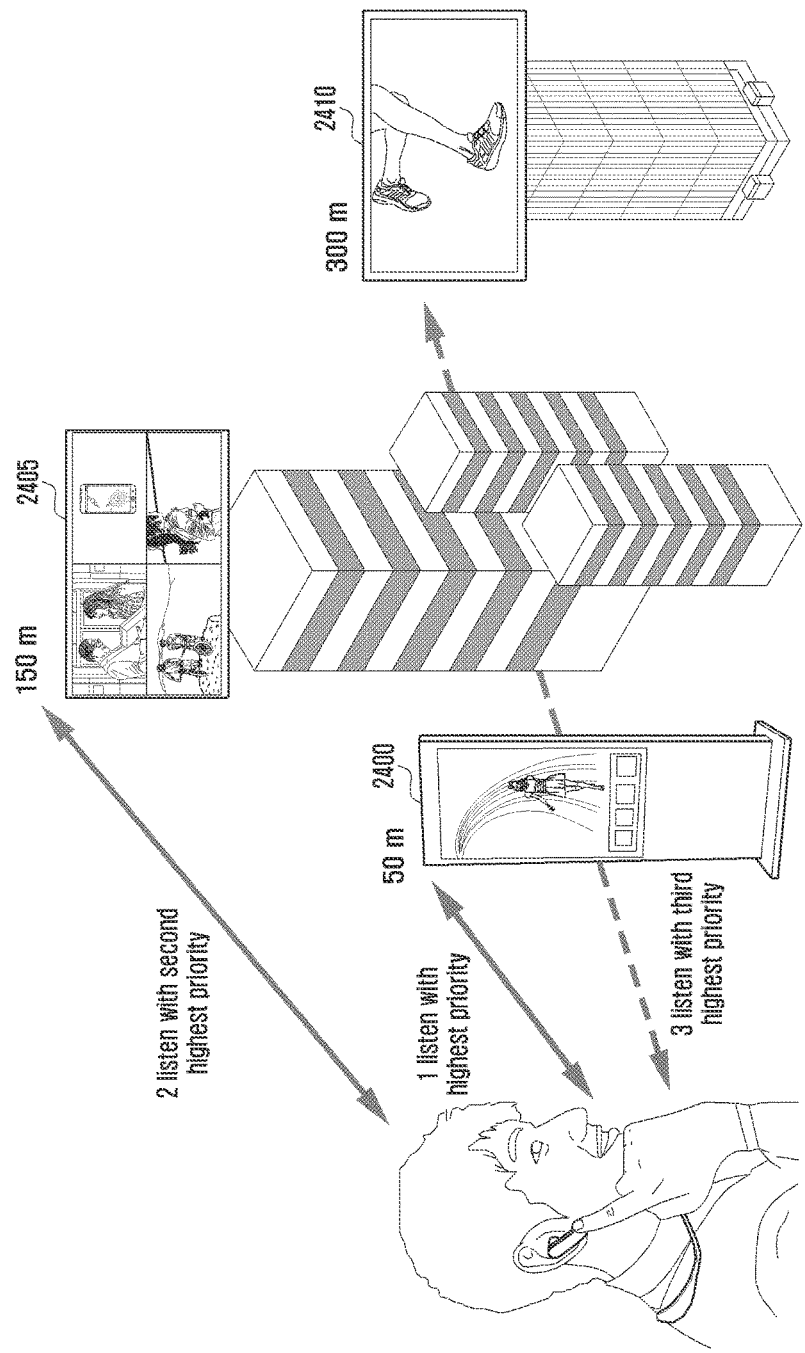

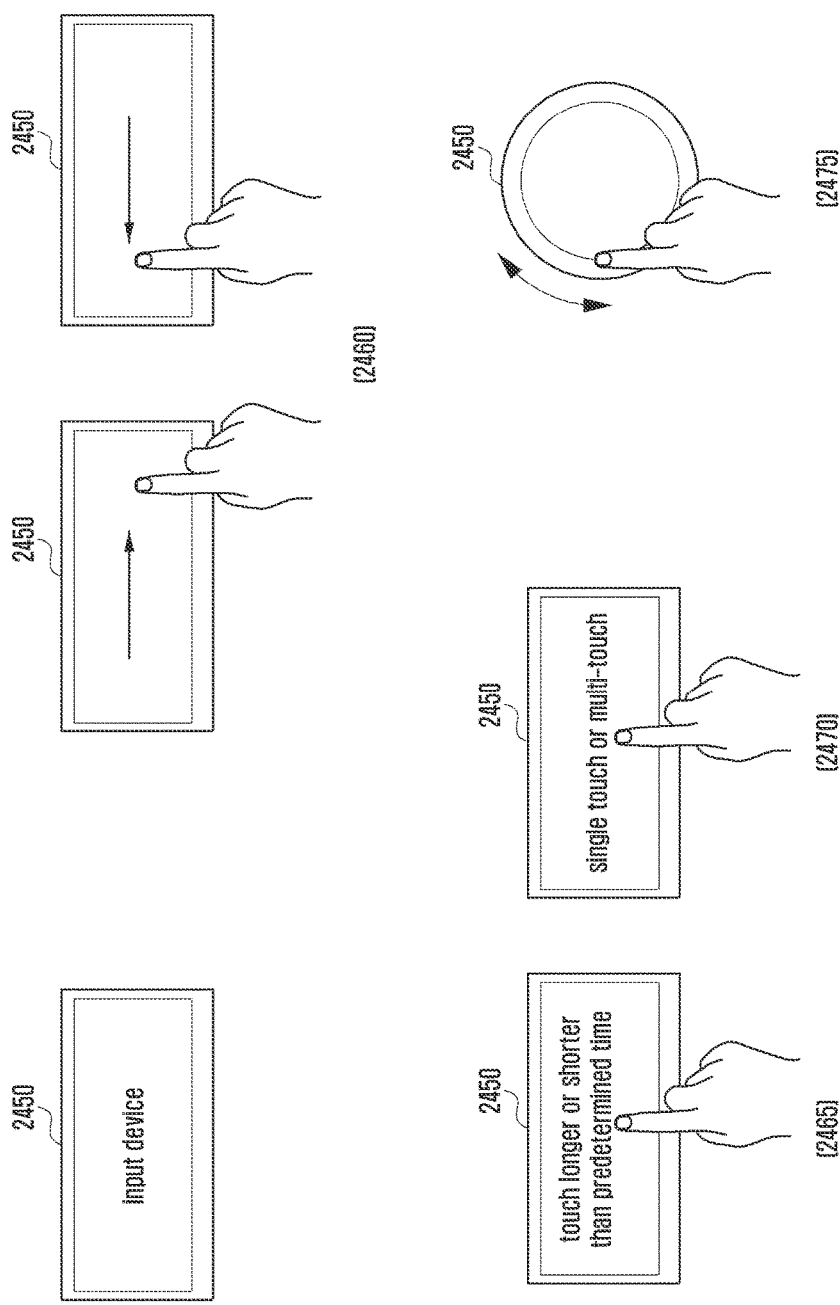

TERMINAL AND DISTANCE ESTIMATION METHOD THEREOF

CROSS-REFERENCE TO RELATED APPLICATION(S)

This application claims the benefit under 35 U.S.C. § 119(e) of a U.S. provisional patent application filed on Nov. 6, 2014 in the U.S. Patent and Trademark Office and assigned Ser. No. 62/076,156, and under 35 U.S.C. § 119(a) of a Korean patent application filed on Mar. 31, 2015 in the Korean Intellectual Property Office and assigned Serial number 10-2015-0045716, and of a Korean patent application filed on Sep. 1, 2015 in the Korean Intellectual Property Office and assigned Serial number 10-2015-0123697, the entire disclosure of each of which is hereby incorporated by reference.

TECHNICAL FIELD

The present disclosure relates to a terminal and a distance estimation method thereof in a wireless communication system supporting device-to-device (D2D) communication.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the rapid popularization of smartphones, various smartphone-based application services are used and this tendency is likely to continue. In line with this tendency, various techniques are discussed to overcome the data congestion caused by the various application services in the cellular system. For example, device-to-device (D2D) communication is a technique to distribute the load of the evolved node B (eNB) which is aggravated by large volume of mobile contents efficiently.

There are various methods for a terminal to locate a position. Representative position locating methods are categorized into the absolute position locating method based on the triangulation technique utilizing global positioning system (GPS) signals or information of multiple base stations and the relative position locating method based on the signal transmission and reception powers.

FIG. 1 is a diagram illustrating an absolute position locating method among terminal positioning methods in a wireless communication system according to the related art.

Referring to FIG. 1, the GPS-based technique as one of the absolute position locating methods determines the locations of the satellites and the GPS receiver based on the signals transmitted by three or more GPS satellites 120 and 125. By calculating the difference between the signal transmission times at the satellites and the signal reception time at the receiver, it is possible to acquire the distance between the satellite and the receiver and, in this case, the transmitted signal includes the information on the location of the GPS satellites 120 and 125.

Referring to FIG. 1, the triangulation technique using a plurality of base stations as another absolute position locating method locates the position of a terminal 100 through triangulation using the position coordinates of neighboring base stations 105, 110, and 115.

FIG. 2 is a diagram illustrating a relative position locating method among terminal positioning methods in a wireless communication system according to the related art.

Referring to FIG. 2, the relative position locating method operates in such a way that a transmit (Tx) terminal 200 provides a receive (Rx) terminal 205 with transmit power information and the Rx terminal 205 estimates a relative distance using the difference between the transmit power and the receive power.

The GPS receiver-based position locating method as one of the absolute position locating methods has a drawback in that the position locating accuracy drops in an indoor environment, a downtown area surrounded by buildings, or a thickly-wooded forest due to the low received signal strength of GPS. In the case of the base station-assisted position locating method which is another absolute position locating method, the position locating error may occur in the downtown area surrounded by huge skyscrapers.

In the case of the relative position locating method based on the transmit power information, there are many elements influencing the accuracy of the distance measurement significantly, such as signal reflection and refraction, multipath propagation, and signal attenuation, and the like.

In the current D2D communication, it is considered to use a signal-based relative position locating method for measuring a distance using the difference between the transmit (Tx) and receive (Rx) powers. The signal-based distance measurement method has low distance estimation accuracy and thus, may make the users subscribed to the services utilizing the distance information feel inconvenienced due to the low accuracy.

In addition, the signal information-based relative position locating method requires an extra operation for transmitting the signal information in addition to the basic discovery operation in the D2D communication. The basic discovery operation in the current D2D communication has been designed with consideration of signal information transmission for distance estimation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a time-based relative position locating method capable of improving a distance estimation accuracy using time information instead of signal information, a method for including the time information in the discovery message, and a method for allowing the transmit (Tx) terminal to transmit the discovery message and the receive (Rx) terminal to receive the discovery message.

Another aspect of the present disclosure is to provide a method for estimating distance between the Tx and Rx terminals using a message in various wireless communication systems.

In accordance with an aspect of the present disclosure, a terminal operating in a wireless communication system supporting Device-to-Device (D2D) communication is provided. The terminal includes a transceiver configured to communicate with other terminals and at least one processor configured to control the transceiver to transmit a discovery message including time information to the other terminals and receive distance information calculated by the other terminals, the distance information being calculated based on the time information.

In accordance with another aspect of the present disclosure, a terminal operating in a wireless communication system supporting D2D communication is provided. The terminal includes a transceiver configured to communicate with other terminals, a time measurement module for measuring time, and at least one processor configured to control the transceiver to receive a discovery message including time information from the other terminal, determines reception time of the discovery message at the time measurement module, and acquires distance information based on the time information and the reception time.

In accordance with another aspect of the present disclosure, a terminal operating in a wireless communication system supporting D2D communication is provided. The terminal includes a transceiver configured to communicate with other terminals, a time measurement module configured to measure time, and at least one processor configured to determine transmission time of a discovery request message at the time measurement module, control the transceiver to transmit the discovery request message to the other terminals and receive a discovery response message including message processing time from the other terminals, determine reception time of the discovery response message, and acquire distance information based on the transmission time, the message processing time, and the reception time.

In accordance with another aspect of the present disclosure, a terminal operating in a wireless communication system supporting D2D communication is provided. The terminal includes a transceiver configured to communicate with other terminals, a time measurement module configured to measure time, and at least one processor configured to control the transceiver to receive a discovery request message including time information request from the other terminals, determine reception time of the discovery request message at the time measurement module, determine resource allocated at transmission time of a discovery response message to the other terminals, acquire message processing time based on the transmission time and the reception time, and control the transceiver to transmit the discovery response message including the message processing time to the other terminals.

In accordance with another aspect of the present disclosure, a discovery method of a terminal in a wireless communication supporting D2D communication is provided. The method includes transmitting a discovery message including time information to other terminals and receiving distance information calculated based on the time information from the other terminals.

In accordance with another aspect of the present disclosure, a discovery method of a terminal in a wireless communication system supporting D2D communication is provided. The method includes receiving a discovery message including time information from other terminals, determining reception time of the discovery message, and acquiring distance information based on the time information included in the discovery message and the reception time.

In accordance with another aspect of the present disclosure, a discovery method of a terminal in a wireless communication system supporting D2D communication is provided. The method includes determining transmission time for transmitting a discovery request message to other terminals, transmitting the discovery request message including time information request to the other terminals, receiving a discovery response message including message processing time, determining reception time of the discovery response message, and acquiring distance information based on the transmission time, the message processing time, and the reception time.

In accordance with another aspect of the present disclosure, a discovery method of a terminal in a wireless communication system supporting D2D communication is provided. The method includes receiving a discovery request message including a time information request from other terminals, determining reception time of the discovery request message, determining resources allocated at the transmission time for transmitting a discovery response message, acquiring message processing time based on the transmission time and the reception time, and transmitting the discovery response message including the message processing time to the other terminals.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 16 is a flowchart illustrating a time information transmission and processing procedure of an Rx terminal according to various embodiments of the present disclosure;

FIG. 24A is a diagram illustrating an Rx terminal to output voice data of Tx terminals based on distance information according to an embodiment of the present disclosure;

FIG. 24C is a diagram illustrating output manipulation on an Rx terminal without any display according to an embodiment of the present disclosure.

Throughout the drawings, it should be noted that like reference numbers are used to depict the same or similar elements, features, and structures.

DETAILED DESCRIPTION

Figure 1:
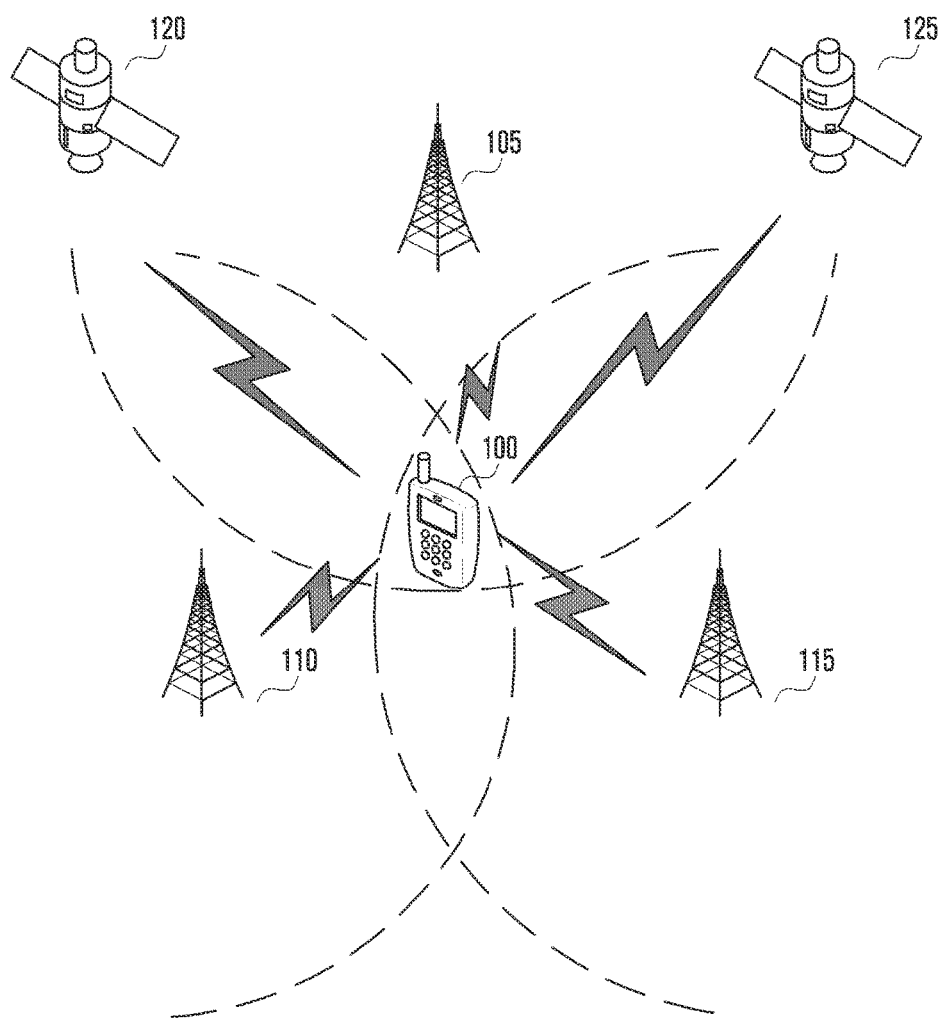
FIG. 1 is a diagram illustrating an absolute position locating method among terminal positioning methods in a wireless communication system according to the related art.
Figure 2:
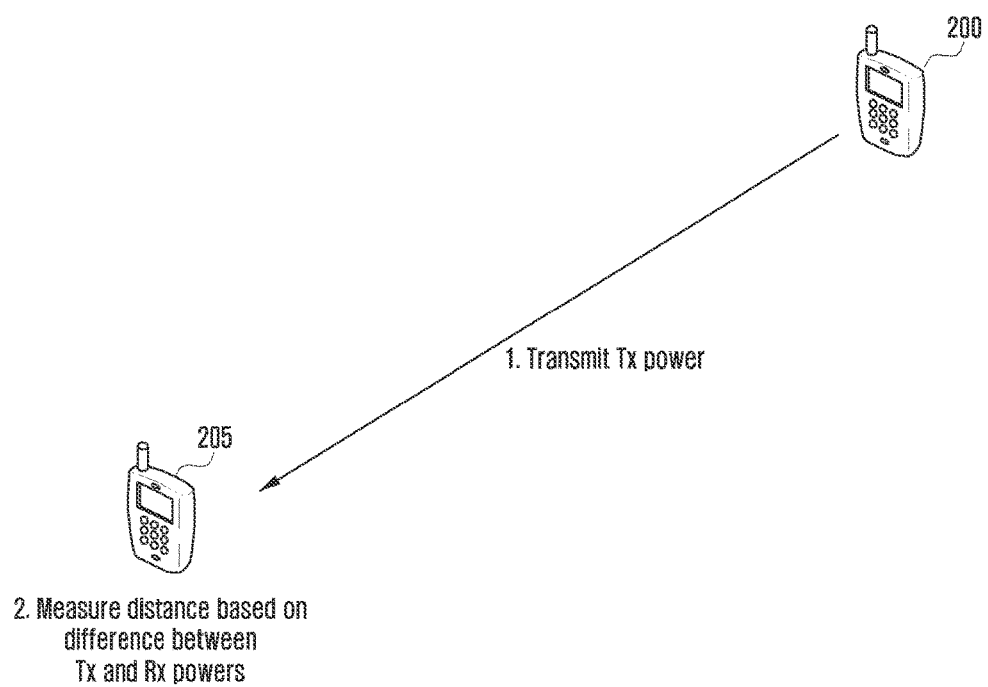
FIG. 2 is a diagram illustrating a relative position locating method among terminal positioning methods in a wireless communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be understood that the expressions "comprises" and "may comprise" is used to specify presence of disclosed function, operation, component, and the like, but do not preclude the presence of one or more functions, operations, components, and the like. It will be further understood that the terms "comprises" and/or "has" when used in this specification, specify the presence of stated feature, number, operation, component, element, or a combination thereof but do not preclude the presence or addition of one or more other features, numbers, operations, components, elements, or combinations thereof.

In various embodiments of the present disclosure, the expression "and/or" is taken as specific disclosure of each and any combination of enumerated things. For example, A and/or B is to be taken as specific disclosure of each of A, B, and A and B.

As used herein, terms, such as "first," "second," and the like, are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the present disclosure.

It will be understood that when an element or layer is referred to as being "connected to" or "coupled to" another element or layer, the element can be directly connected or coupled to the other element or layer or intervening elements or layers may be present. In contrast, when an element is referred to as being "directly on," "directly connected to" or "directly coupled to" another element or layer, there are no intervening elements or layers present.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Various embodiments of the present disclosure propose methods for the transmit (Tx) or receive (Rx) terminal to estimate the distance between the Tx and Rx terminals using the time information which the Tx terminal transmits to the Rx terminal or for which the Tx terminal requests to the Rx terminal in a wireless communication system supporting D2D communication, the time information being carried in the discovery message. The time information included in the discovery message may be the discovery message transmission time of the Tx terminal, the discovery message processing time of the Rx terminal, or the message processing time of the server.

Various embodiments of the present disclosure propose method for the Tx or Rx terminal to estimate the distance between the Tx and Rx terminals using the time information required for distance measurement in a wireless communication system supporting device-to-device (D2D) communication, the time information being transmitted from the Tx terminal to the Rx terminal or requested by the Tx terminal to the Rx terminal. According to various embodiments of the present disclosure, the time information carried in the discovery message may include at least one of the discovery message transmission time of the Tx terminal, the discovery message processing time of the Rx terminal, and the message processing time of the server.

According to various embodiments of the present disclosure, the distance estimation methods may include a method of estimating the distance based on the absolute reference time with the assistance of base stations and a method of estimating the distance between the terminals without assistance of any base station.

According to an embodiment of the present disclosure, the absolute reference time-based distance estimation method with the assistance of a base station is characterized in that the Tx and Rx terminals acquire absolute reference time synchronization through system information broadcast by the base station. If the absolute time synchronization is acquired, the Tx terminal transmits to the Rx terminal a discovery message including the time information. The Rx terminal receives the discovery message including the time information and estimates the distance between the Tx and Rx terminals based on the time information received from the Tx terminal.

According to an embodiment of the present disclosure, the independent inter-terminal distance measurement method without assistance of the base station is characterized in that the Tx terminal transmits to the Rx terminal a discovery request message including a request for the time information of the Rx terminal. If the discovery request message is received, the Rx terminal transmits to the Tx terminal a discovery response message including its discovery message processing time.

If the discovery response message including the discovery message processing time of the Rx terminal is received, the Tx terminal may estimate the distance between the Tx and Rx terminals using the time information of the Rx terminal.

Detailed description of the present disclosure is made hereinafter with reference to the accompanying drawings.

Various embodiments of the present disclosure propose methods for the Rx terminal to estimate the distance based on the time information of the Tx terminal and the Tx terminal to estimate the distance based on the time information of the Rx terminal.

The method for the Rx terminal to estimate distance based on the time information of the Tx terminal is described hereinafter.

Figure 3A:
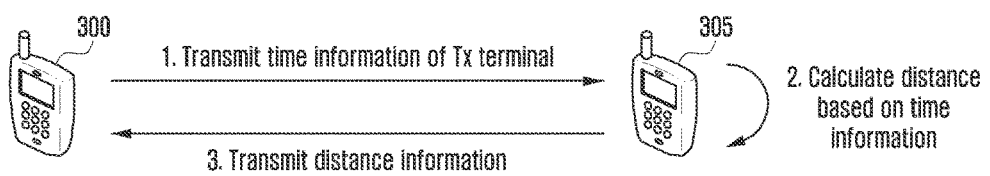
FIG. 3A is a diagram illustrating a distance calculation operation of a receive (Rx) terminal according to an embodiment of the present disclosure.

FIG. 3A is a diagram illustrating a distance calculation operation of an Rx terminal according to an embodiment of the present disclosure.

Referring to FIG. 3A, a Tx terminal 300 provides an Rx terminal 305 with its transmission time information for use at the Rx terminal 305 in estimating the distance. The transmission time information may be included in the discovery message. The Rx terminal 305 estimates the distance between the Tx and Rx terminals based on the transmission time received from the Tx terminal 300. The Rx terminal 305 may transmit the estimated distance information to the Tx terminal 300.

Figure 3B:
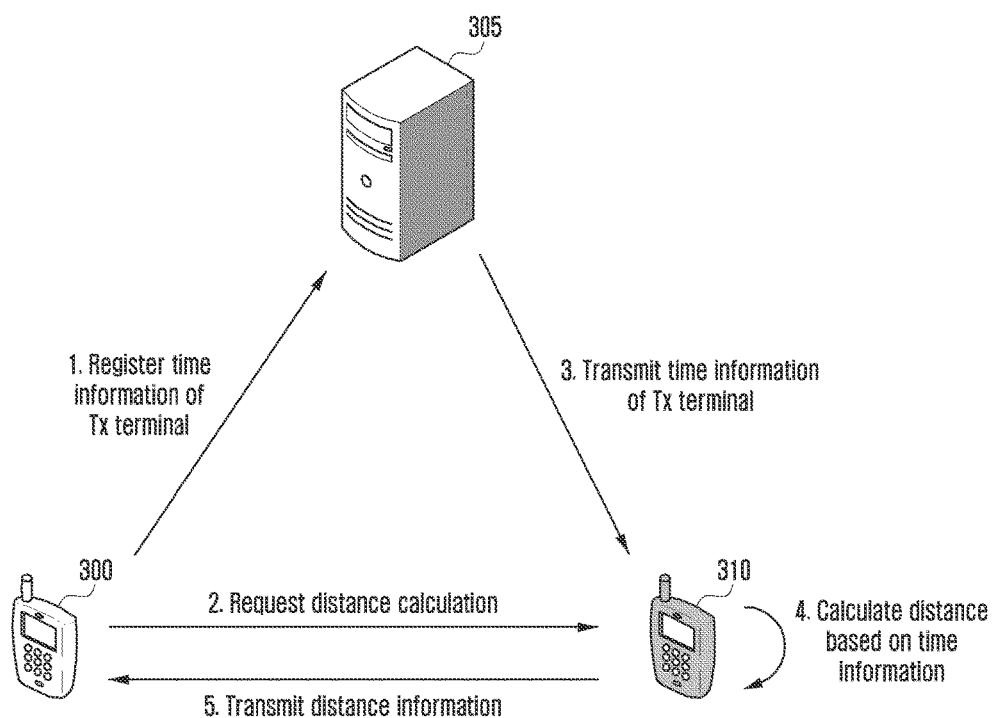
FIG. 3B is a diagram illustrating a distance calculation operation of an Rx terminal according to an embodiment of the present disclosure.

FIG. 3B is a diagram illustrating a distance calculation operation of an Rx terminal according to an embodiment of the present disclosure. In this embodiment of the present disclosure, the Rx terminal receives the time information from a server.

Referring to FIG. 3B, the Rx terminal 305 receives the transmission time information of the Tx terminal 300 via a server 310. The Tx terminal 300 transmits its transmission time information to the server 310 and transmits to the Rx terminal 305 a distance calculation request message. If the distance calculation request message is received, the Rx terminal 305 requests to the server 310 for the transmission time information of the Tx terminal 300. If the transmission time request message is received, the server 310 transmits to the Rx terminal 305 the transmission time information of the Tx terminal 300. The Rx terminal 305 estimates the distance between the Tx and Rx terminals 300 and 305, respectively, based on the time information of the Tx terminal which is received from the server 310. The Rx terminal 305 transmits to the Tx terminal 300 the estimated distance information.

Figure 4:
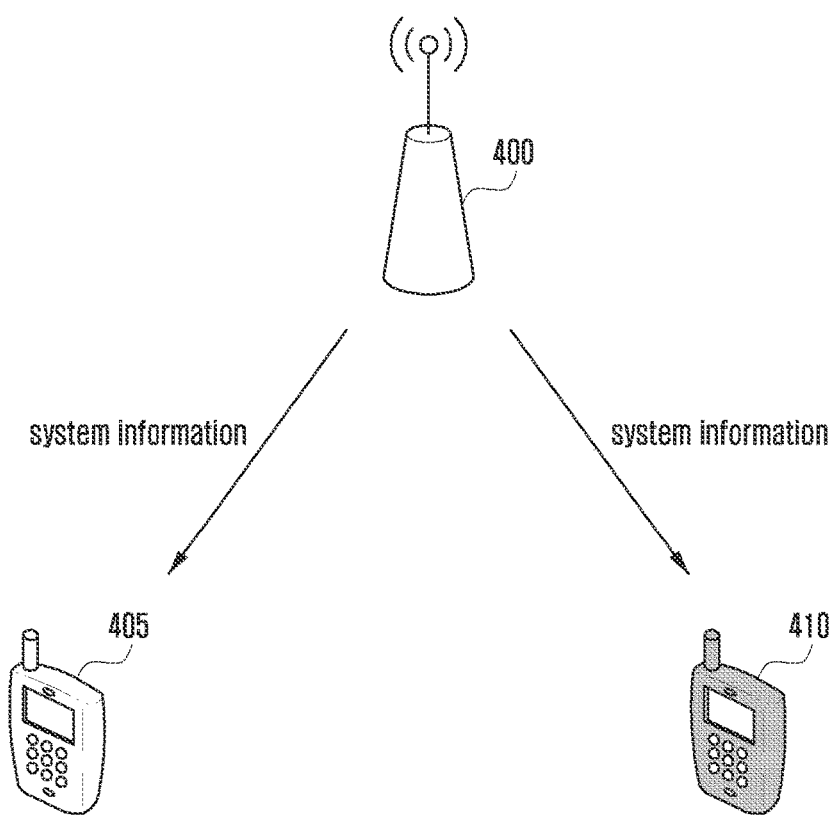
FIG. 4 is a diagram illustrating a method of providing absolute reference time for use at an Rx terminal in calculating a distance according to an embodiment of the present disclosure.

FIG. 4 is a diagram illustrating a method of providing absolute reference time for use at the Rx terminal in calculating a distance according to an embodiment of the present disclosure.

Referring to FIG. 4, a base station 400 broadcasts the system information including absolute reference time such that Tx and Rx terminals 405 and 410, respectively, acquire absolute reference time synchronization. In a long term evolution (LTE) system according to an embodiment of the present disclosure, the system information is broadcast in a system information block (SIB), and the Tx and Rx terminals 405 and 410, respectively, acquire absolute reference time synchronization using the coordinate universal time (UTC) included in SIB 16.

Figure 5:
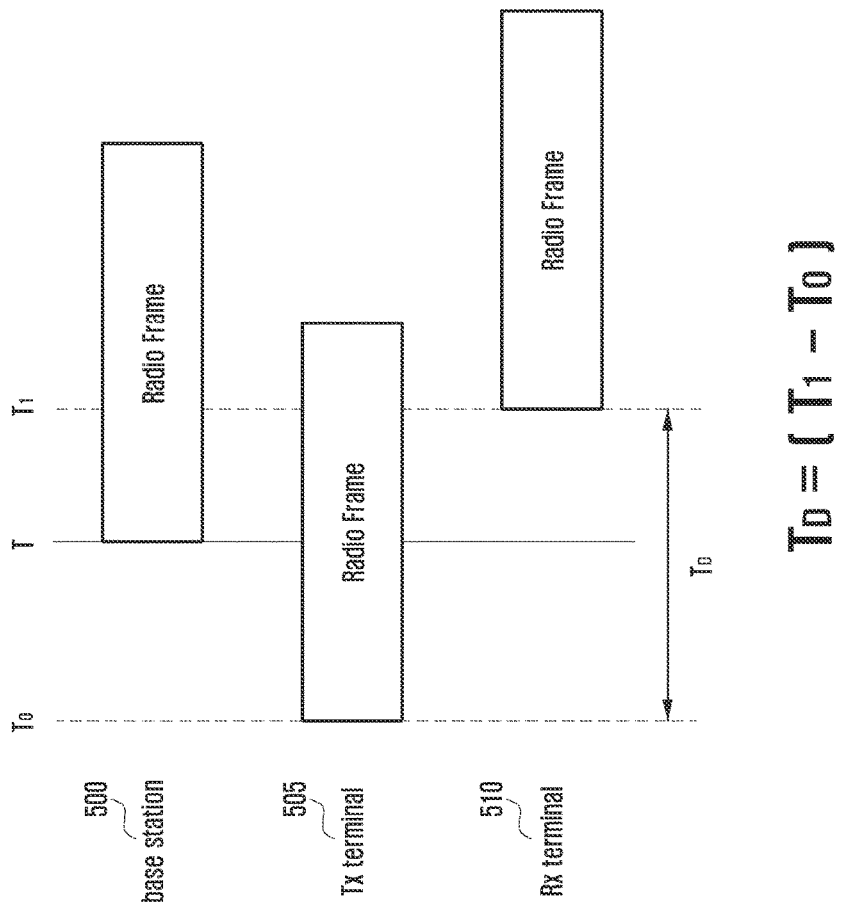
FIG. 5 is a diagram illustrating a time calculation method of an Rx terminal according to an embodiment of the present disclosure.

FIG. 5 is a diagram illustrating a time calculation method of an Rx terminal according to an embodiment of the present disclosure.

Referring to FIG. 5, Tx and Rx terminals 505 and 510, respectively, may acquire time synchronization based on the absolute reference time (T) provided by a base station 500.

The Tx terminal 505 determines the radio resource time allocated for transmitting a message including time information to know the message transmission time (T0). The Rx terminal 510 determines the time when the message including the time information is received at a time measurement module to know the message reception time (T1).

The Rx terminal 510 can determine the radio wave travel time (TD) based on the signal transmission time (T0) and signal reception time (T1) as shown in Equation 1.

$$T_D = (T_1 - T_0)$$ Equation 1

The distance between the Tx and Rx terminals 505 and 510, respectively, can be calculated by multiplying the radio wave travel time (TD) by radio wave travel speed.

The distance between the terminals can be calculated by Equation 2.

$$\text{Distance} = T_D * C$$ Equation 2

Figure 6:
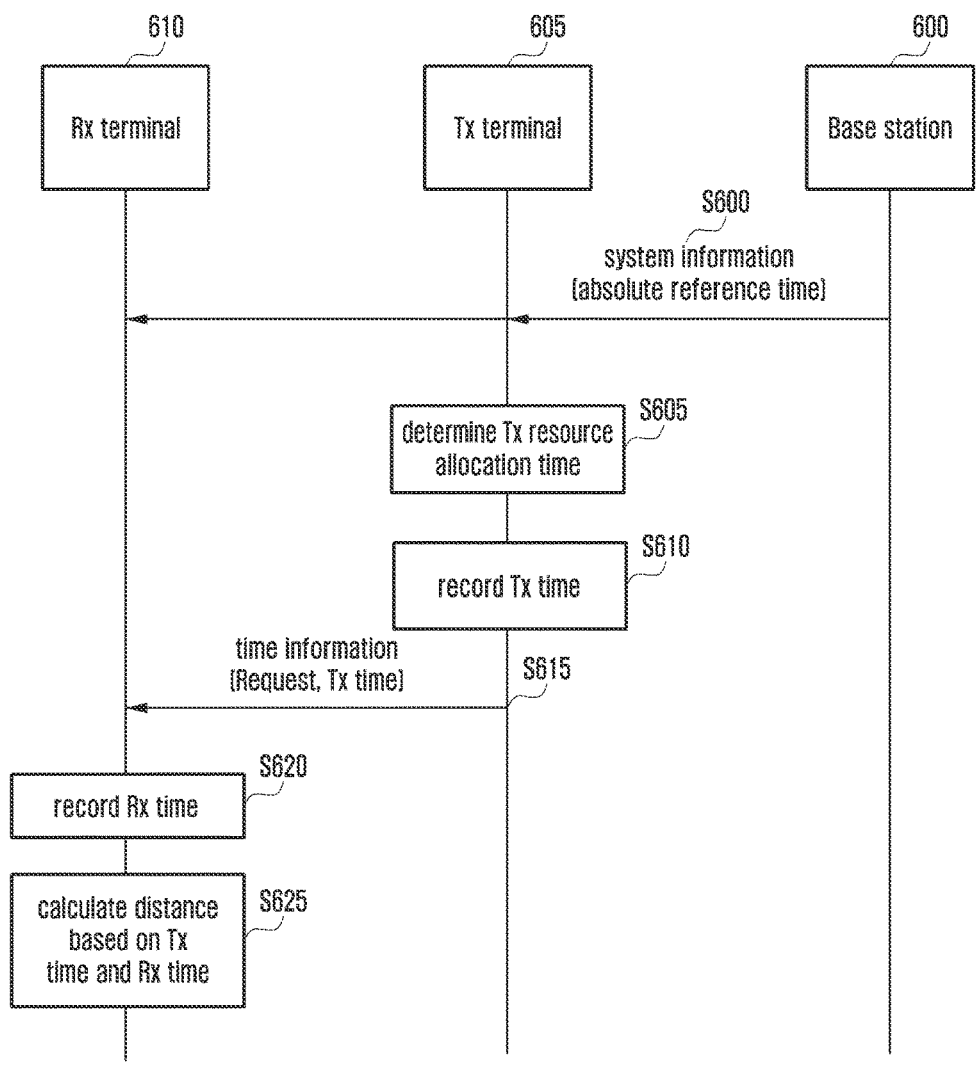
FIG. 6 is a signal flowchart illustrating a distance calculation method of an Rx terminal according to an embodiment of the present disclosure.

FIG. 6 is a signal flowchart illustrating a distance calculation method of an Rx terminal according to an embodiment of the present disclosure.

Referring to FIG. 6, a base station 600 broadcasts system information such that Tx and Rx terminals 605 and 610, respectively, acquire absolute reference time synchronization based on the system information at operation S600.

After synchronizing the absolute reference time, the Tx terminal 605 determines the radio resource time allocated for transmitting the message including the time information to determine the message transmission timing at operation S605.

The Tx terminal 605 stores the message transmission time information in the memory at operation S610. Afterward, the Tx terminal 605 transmits to the Rx terminal 610 a time information message including the transmission time information and a distance calculation request at operation S615. In this embodiment of the present disclosure, the message transmitted from the Tx terminal 605 to the Rx terminal 610 may be included in the D2D discovery message.

If the message including the time information is received, the Rx terminal 610 determines the reception time at the time measurement module and stores the reception time information in the memory at operation S620.

The Rx terminal 610 determines the transmission time of the Tx terminal 605 based on the transmission time information included in the received message and calculates the radio wave travel time based on the difference between the transmission time and the reception time included in the time information stored in the memory at operation S625. The Rx terminal 610 may also calculate the distance between the Tx and Rx terminals 605 and 610 based on the radio wave travel time at operation S625.

Figure 7A:
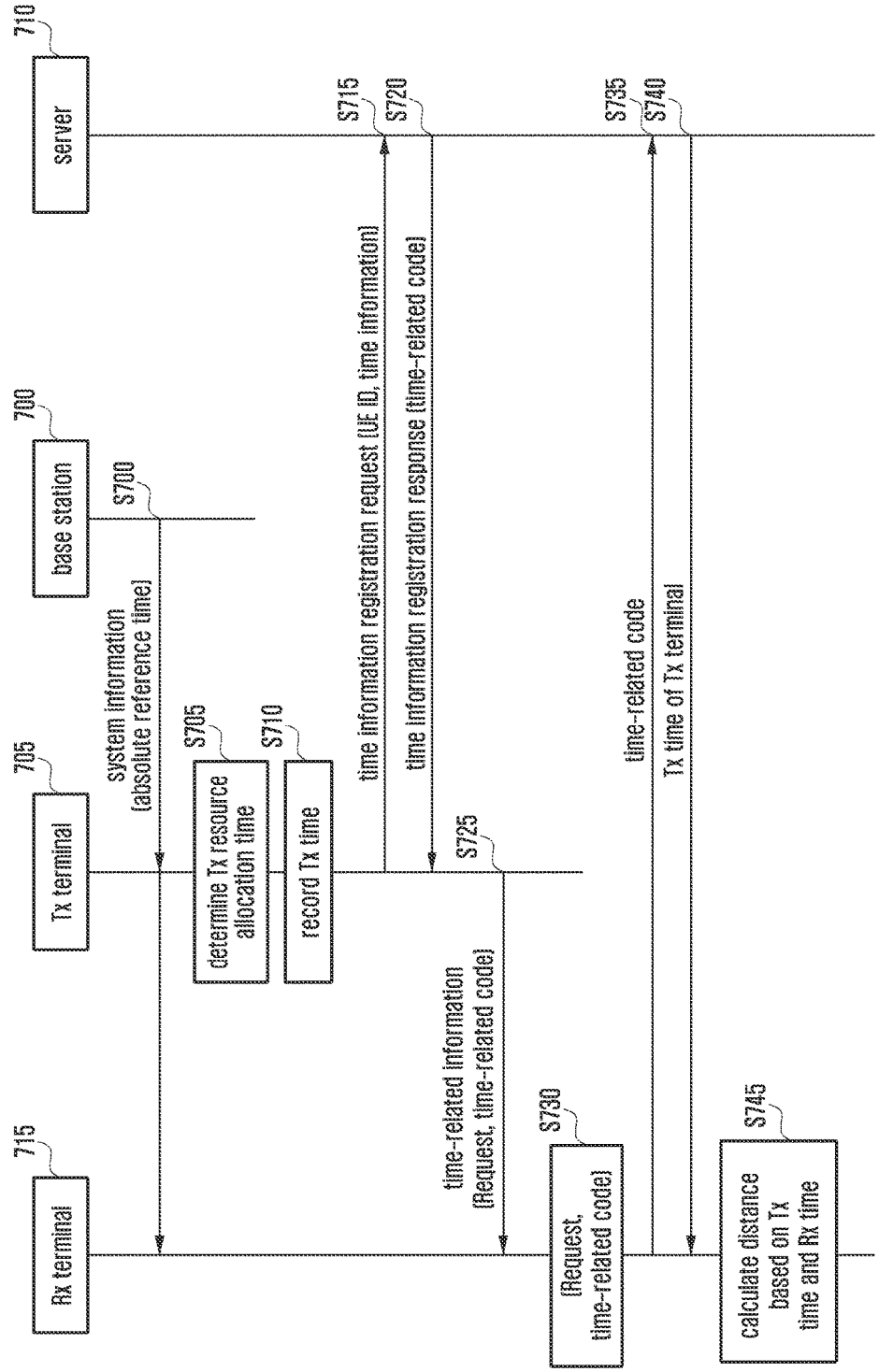
FIG. 7A is a message flow diagram illustrating a distance calculation method of an Rx terminal according to an embodiment of the present disclosure.

FIG. 7A is a message flow diagram illustrating a distance calculation method of an Rx terminal according to an embodiment of the present disclosure. In this embodiment of the present disclosure, the Rx terminal receives the transmission time information of the message carrying the time information from a server.

Referring to FIG. 7A, a base station 700 broadcasts system information such that Tx and Rx terminals 705 and 715, respectively, acquire absolute reference time synchronization based on the system information at operation S700.

After synchronizing the absolute reference time, the Tx terminal 705 determines the radio resource time allocated for transmitting the message including time information to determine message transmission timing at operation S705. The Tx terminal 705 stores the message transmission time in the memory at operation S710.

The Tx terminal 705 transmits to a server 710 a time information registration request message including a Tx terminal identifier (user equipment identifier (UE ID)) and Tx terminal's message transmission time at operation S715.

The server 710 generates a terminal-specific time-related code based on the message transmission time of the Tx terminal 705 and the UE ID and transmits to the Tx terminal 705 a time information registration response message including the time-related code at operation S720.

The Tx terminal 705 transmits to the Rx terminal 715 the time information message including a distance calculation request indicating the necessity of distance calculation with the assistance of the server 710 and time-related code generated by the server 710 at operation S725. In this embodiment of the present disclosure, the time information message may be included in the D2D discovery message.

If the time information message is received, the Rx terminal 715 determines the message reception time at the time measurement module and stores the message reception time information in the memory at operation S730. Afterward, the Rx terminal 715 transmits to the server 710 the time-related code at operation S735, and the server 710 transmits to the Rx terminal 715 the transmission time information of the Tx terminal 705 at operation S740.

The Rx terminal 715 calculates the distance between the Tx and Rx terminals 705 and 715 based on the message transmission time of the Tx terminal 705 which is received from the server 710 and the message reception time stored in the Rx terminal 715 at operation S745.

Figure 7B:
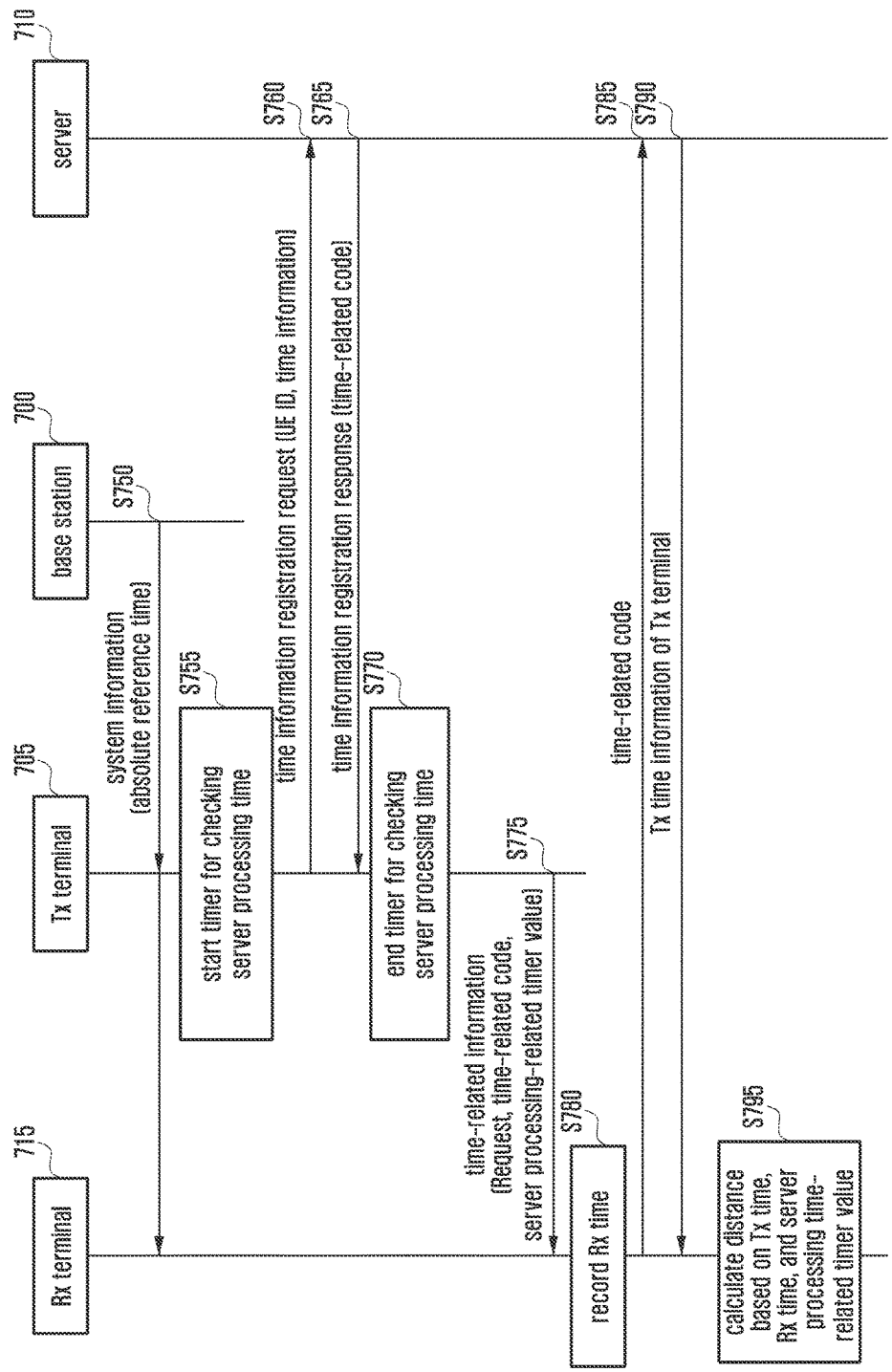
FIG. 7B is a message flow diagram illustrating a distance calculation method of an Rx terminal according to an embodiment of the present disclosure.

FIG. 7B is a message flow diagram illustrating a distance calculation method of an Rx terminal according to an embodiment of the present disclosure. In this embodiment of the present disclosure, the transmission time of the time information registration request message transmitted to the server is used.

Referring to FIG. 7B, the base station 700 broadcasts system information such that the Tx and Rx terminal 705 and 715, respectively, acquire absolute reference time synchronization based on the system information at operation S750.

The Tx terminal 705 may start a timer to count the processing time of the server 710 before requesting to the server 710 for time information registration at operation S755.

After starting the timer, the Tx terminal 705 transmits to the server 710 the time information registration request message including the Tx UE ID and time information request message transmission time information at operation S760.

The server 710 generates a terminal-specific time-related code based on the time information registration request message transmission time and the Tx UE ID and transmits to the Tx terminal 705 a time information registration response message including the time-related code at operation S765.

If the time information registration response message is received, the Tx terminal 705 stops the timer at operation S770.

The Tx terminal 705 transmits to the Rx terminal 715 the time information message including a distance calculation request indicating the necessity of distance calculation with the assistance of the server 710, the time-related code, and the server processing time determined at the timer at operation S775. In this embodiment of the present disclosure, the time information message may be included in the D2D discovery message.

If the time information message is received, the Rx terminal 715 determines the message reception time at the time measurement module and stores the message reception time information in the memory at operation S780. Afterward, the Rx terminal 715 transmits to the server 710 the time-related code at operation S785, and the server 710 transmits to the Rx terminal 715 the transmission time information of the Tx terminal 705 at operation S790.

The Rx terminal 715 calculates the distance between the Tx and Rx terminals 705 and 715, respectively, based on the reception time of the message including the time information registration request message transmission time which is received from the server 710 and the time information stored in the Rx terminal 715 and the service processing time acquired at the timer at operation S795.

Figure 8:
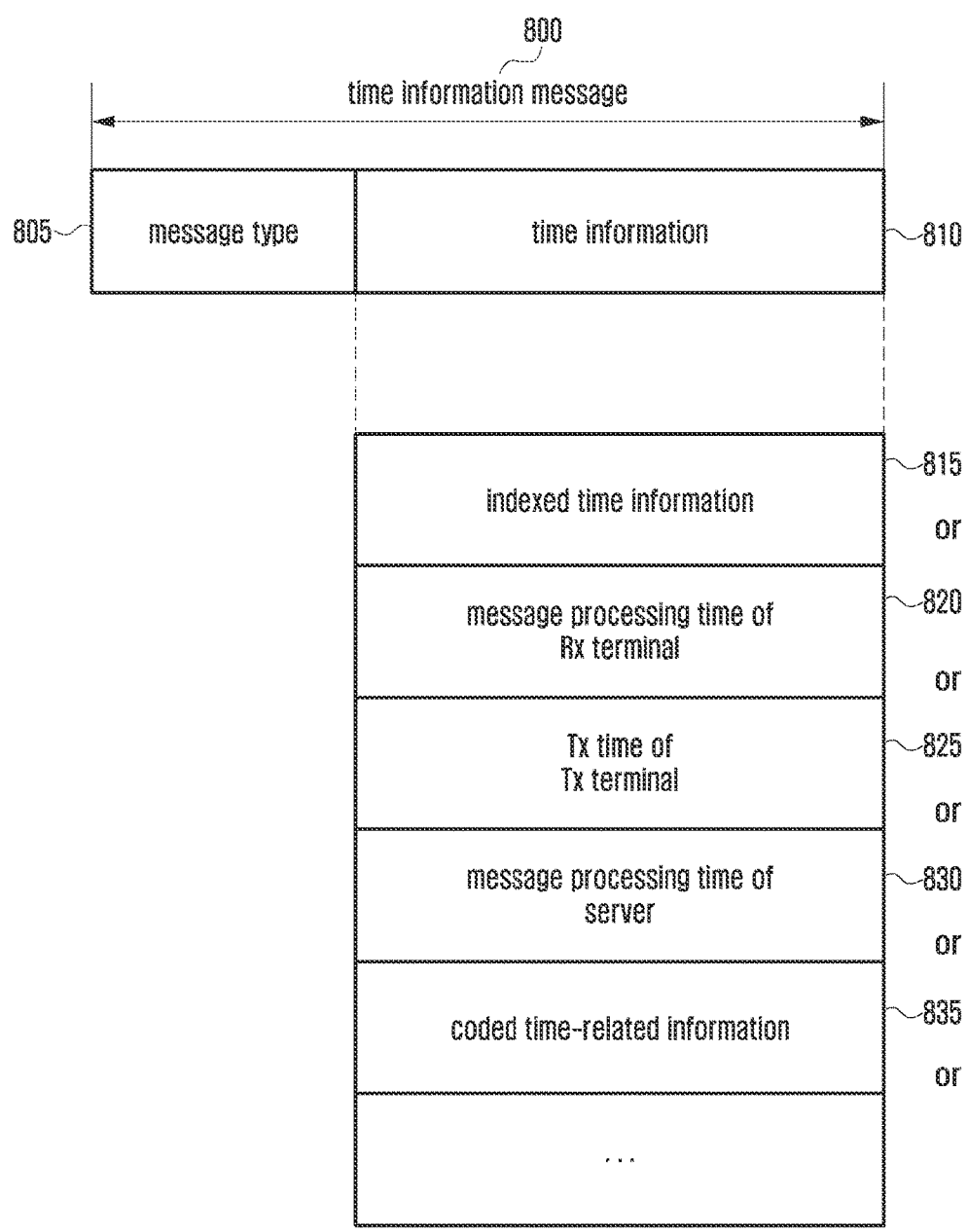
FIG. 8 is a diagram illustrating a format of a time information message for use in distance estimation according to various embodiments of the present disclosure.

FIG. 8 is a diagram illustrating a format of a time information message for use in distance estimation according to various embodiments of the present disclosure.

Referring to FIG. 8, the information included in a time information message 800 may include a message type field 805 and a time information field 810. The time information field 810 may include at least one of indexed time information 815, an Rx terminal's message processing time 820, a Tx terminal's transmission time 825, a server's message processing time 830, and coded time-related information 835, e.g., a time-related code.

According to an embodiment of the present disclosure, the message type field 805 of the time information message indicates the status of the current message.

For example, if the Tx terminal transmits the time information message including the transmission time information for use in distance calculation at the Rx terminal, the message type field is set to 00 to indicate that the transmission time information is included.

According to an embodiment of the present disclosure, if the Tx terminal requests to the Rx terminal for the time information, the message type field is set to 10 to indicate the request for the time information of the Rx terminal. In response to the request, the Rx terminal transmits a response message of which the message type field is set to 10.

The indexed time information may be generated in the form of an index to indicate one of split times and recorded as approximate time. For example, the indexed time information is set to 0000 for the transmission time between 0 ns and 30 ns and 0001 for the time between 31 ns and 60 ns.

In an embodiment of the present disclosure, the Rx terminal's message processing time is set to 0000 for the time between 0 ns and 30 ns and 0001 for the time between 31 ns and 60 ns.

Figure 9:
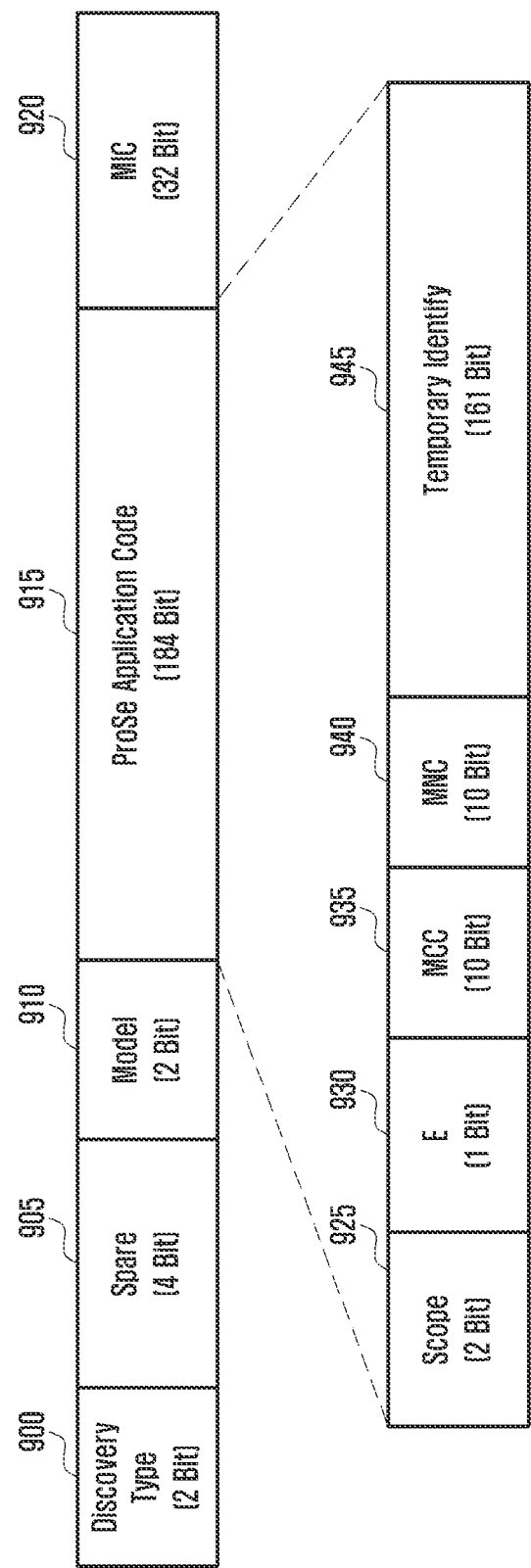
FIG. 9 is a diagram illustrating a structure of a device-to-device (D2D) discovery message for use in a D2D communication according to various embodiments of the present disclosure.

FIG. 9 is a diagram illustrating a structure of a D2D discovery message for use in a D2D communication according to various embodiments of the present disclosure.

Referring to FIG. 9, the discovery message includes a discovery type field 900, a spare field 905, a discovery model field 910, a ProSe application code field 915, and a message integrity check (MIC) field 920.

The discovery type field 900 indicates that the message is a discovery message for D2D communication. For example, the discovery type field 900 is set to 01 to indicate that the message is used for basic discovery operation.

The discovery model field 910 indicates the model of the discovery message. For example, the discovery model field 910 is set to 01 to express "I'm Here" and this indicates that the discovery message includes an advertisement message.

The ProSe application code field 915 includes a scope field 925, an extended (E) field 930, a mobile country code (MCC) field 935, a mobile network code (MNC) field 940, and a temporary identity field 945.

Whether either the MCC field 935 or the MNC field 940 is used is determined depending on the scope field 925 and the E field 930.

The temporary identity field 945 may include the content of the message to be actually transmitted. For example, if it is necessary to transmit an advertisement, the advertisement is coded into the temporary identity field 945.

The MIC field 920 may be used for integrity check of the ProSe application code.

According to an embodiment of the present disclosure, the discovery message may include a discovery type field indicating whether the discovery is the open discovery or a restricted discovery, a discovery model indicating whether the message is of requesting for or providing information, and a ProSe application code containing message information.

According to an embodiment of the present disclosure, the ProSe application code field includes the ProSe application code with only the MNC or MCC and MNC depending on the scope field. For example, the scope field is set to 00 for the global scope use, 10 for the country-specific use, and 11 for the public land mobile network-specific (PLMN-specific) use.

Figure 10A:
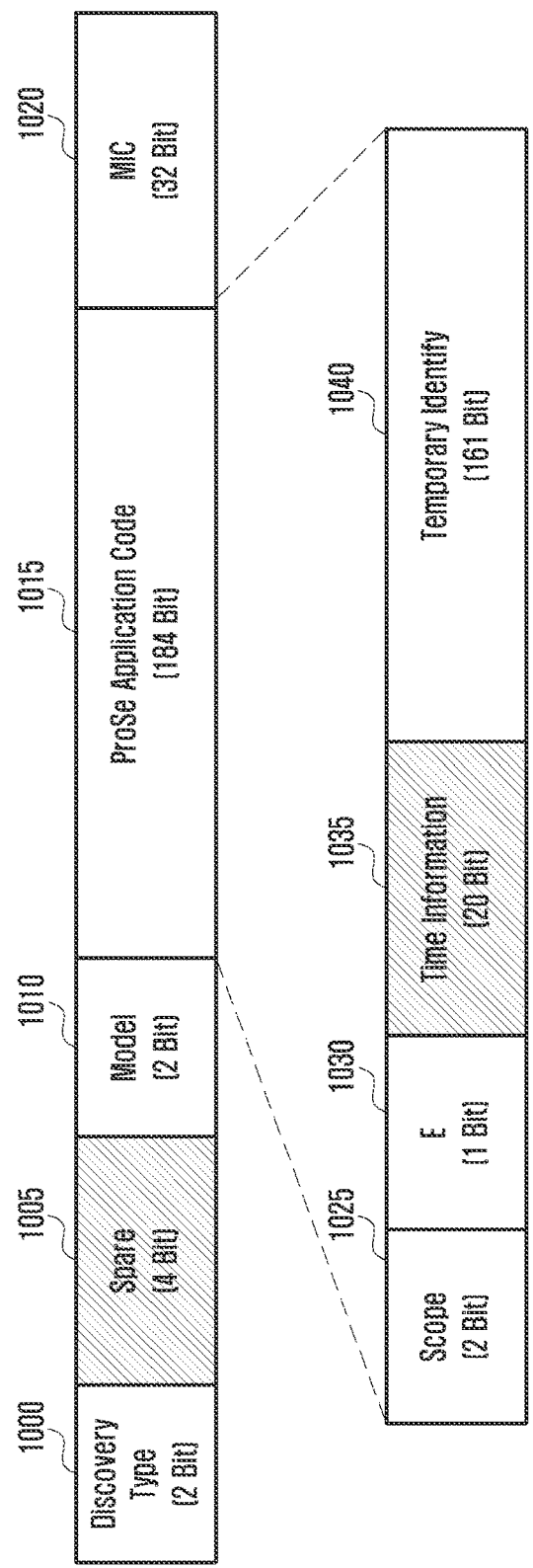
FIG. 10A is a diagram illustrating a discovery message format for distance estimation with spare, mobile country code (MCC), and mobile network code (MNC) fields according to an embodiment of the present disclosure.
Figure 10B:
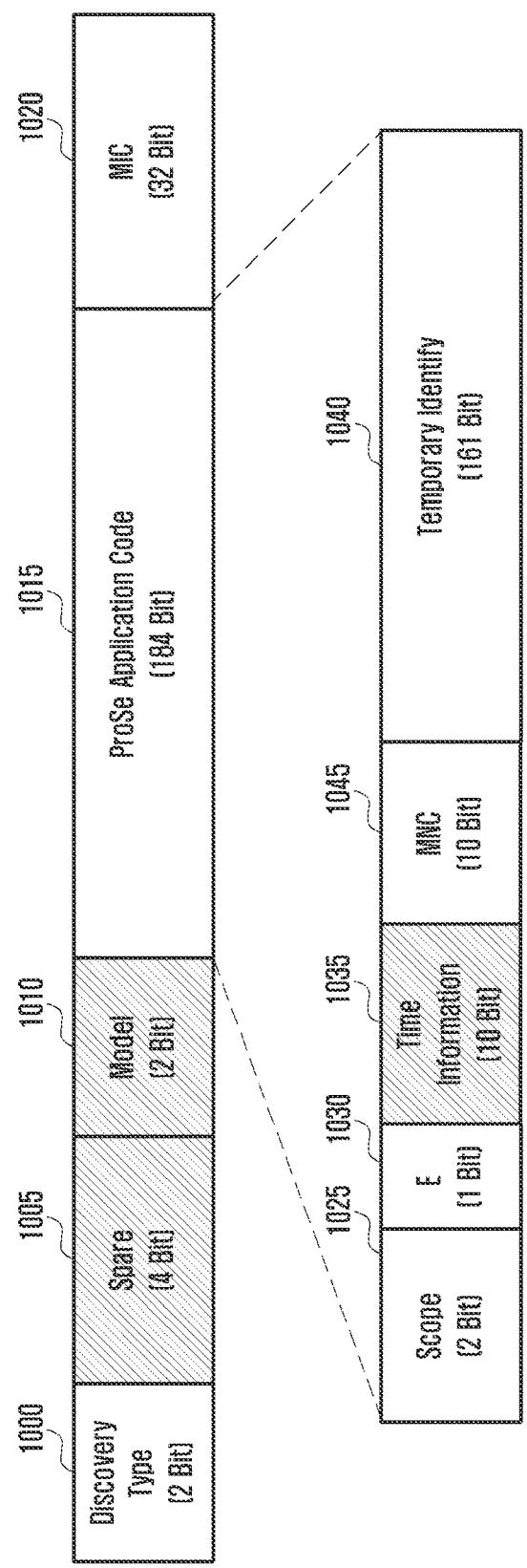
FIG. 10B is a diagram illustrating a discovery message format for distance estimation with spare, model, and MCC fields according to an embodiment of the present disclosure.
Figure 10C:
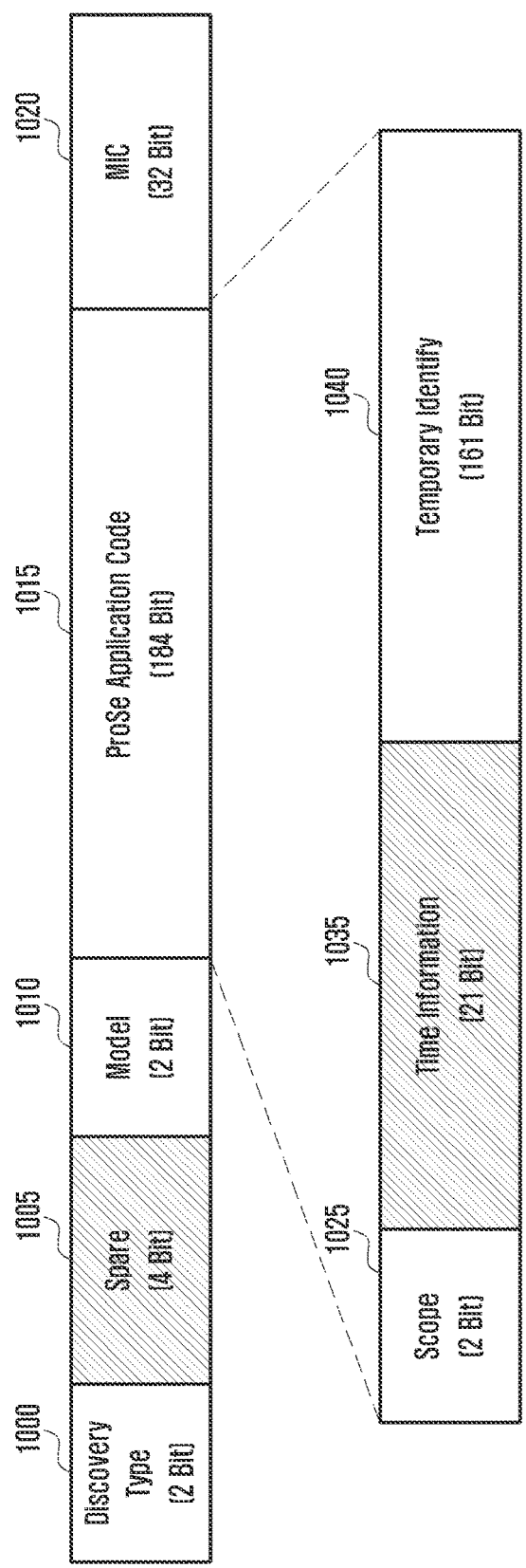
FIG. 10C is a diagram illustrating a discovery message format for distance estimation with spare, extended (E), MCC, and MNC fields according to an embodiment of the present disclosure.
Figure 10D:
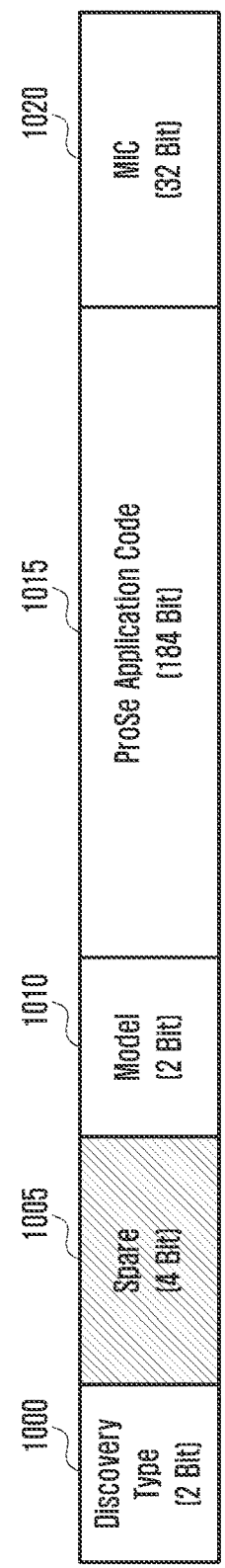
FIG. 10D is a diagram illustrating a discovery message format for distance estimation with spare field according to an embodiment of the present disclosure.
Figure 10E:
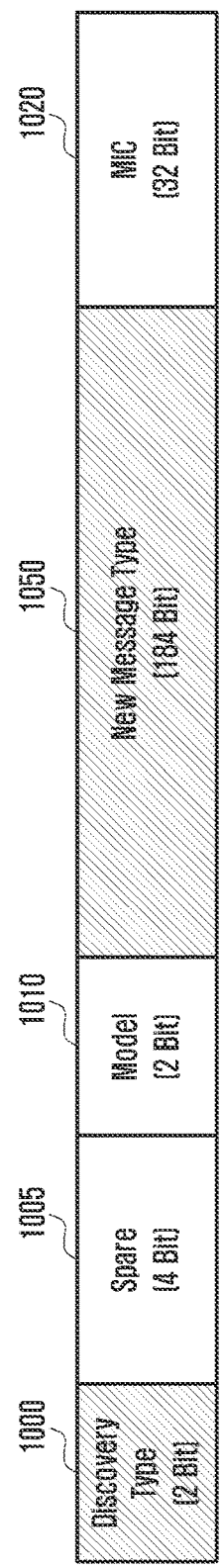
FIG. 10E is a diagram illustrating a discovery message format for distance estimation with a discovery type field according to an embodiment of the present disclosure.

According to various embodiments of the present disclosure, the discovery message carrying the time information for distance estimation may be formatted as shown in FIGS. 10A to 10C depending on the use of the scope field, the indexed time information-based approximate value estimation method is accomplished with the message format of FIG. 10D, and the discovery message may be modified to have the new message type field as shown in FIG. 10E.

FIG. 10A is a diagram illustrating a discovery message format for distance estimation with spare, MCC, and MNC fields according to an embodiment of the present disclosure.

Referring to FIG. 10A, the discovery message according to this embodiment of the present disclosure includes a discovery type field 1000, a spare field 1005, a discovery model field 1010, a ProSe application code field 1015, and a MIC field 1020.

In this embodiment of the present disclosure, the ProSe application code field 1015 includes a scope field 1025, an E field 1030, a time information field 1035, and a temporary identity field 1040. For example, the legacy MCC and MNC fields are used as a time information field 1035.

In this embodiment of the present disclosure, the spare field 1005 and time information field 1035 (legacy MCC and MNC fields) are used to carry the time information. The time information included in the discovery message may be formatted as shown in FIG. 8.

In the discovery message structure proposed in an embodiment of the present disclosure, how to use the MCC and MNC fields as the time information field 1035 depends on the scope field 1025. For example, if the scope field 1025 is set to a value indicating a global scope, this indicates that the ProSe application code is globally-unique and includes neither MCC nor MNC. In this case, the MCC and MNC fields can be used as the time information field 1035 to carry the time information for distance measurement.

Figure 11:
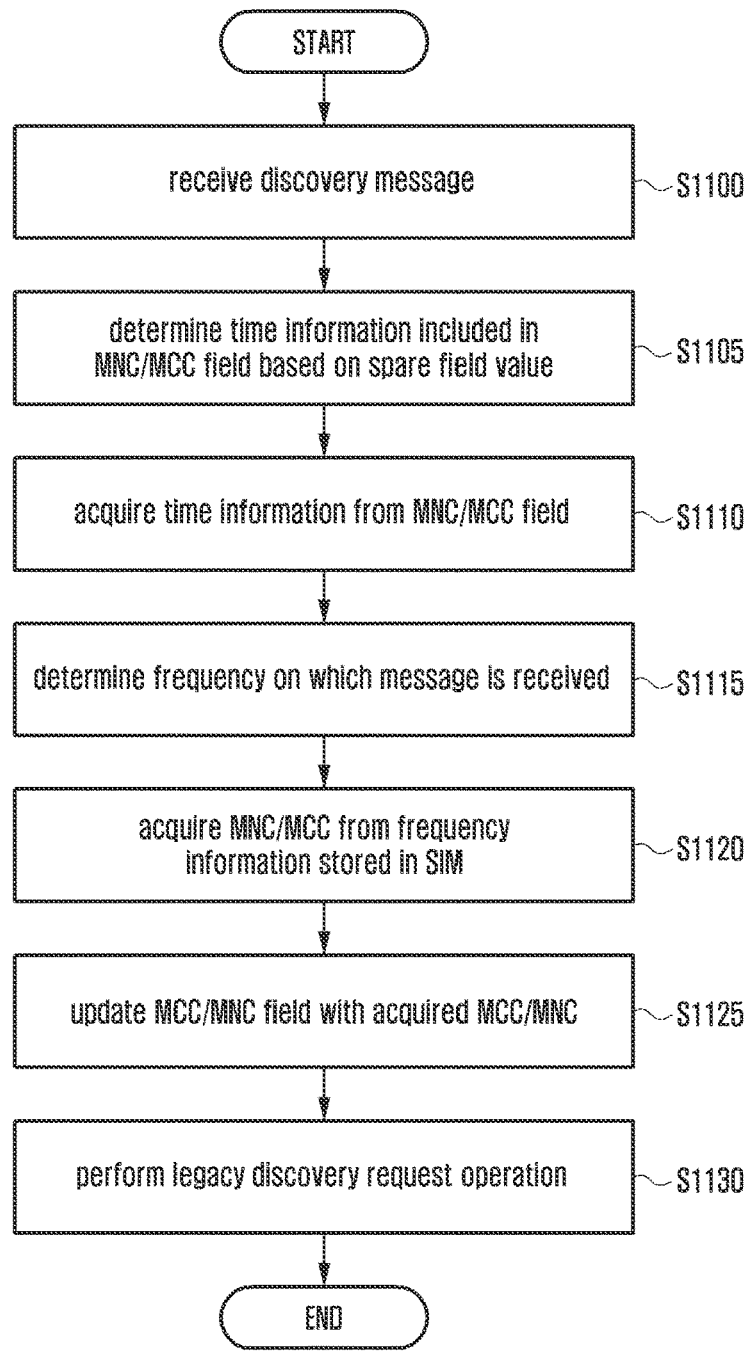
FIG. 11 is a flowchart illustrating a method for an Rx terminal to use MNC and MCC fields when a scope field of a discovery message is set to a value indicating public land mobile network-specific (PLMN-specific) according to an embodiment of the present disclosure.

If the scope field 1025 is PLMN-specific, the MNC and MCC fields may be used as the time information field 1035 according to the PLMN identifier such that the Rx terminal uses the time information field 1035 of the discovery message to receive the time information. FIG. 11 illustrates a case where the Rx terminal processes the MNC and MCC fields of the discovery message of which the scope field is set to PLMN-specific.

The Tx terminal may set the spare field 1005 to a value indicating that the discovery message carries time information. For example, if the spare field 1005 is set to 00, this indicates that the discovery message is PLMN-specific and carries time information. The Tx terminal may uses the MNC and MCC fields as the time information field 1035 to carry the time information for distance measurement as in the case where the scope field 1005 is set to a value indicating global scope.

FIG. 11 is a flowchart illustrating a method for an Rx terminal to use MNC and MCC fields when a scope field of a discovery message is set to a value indicating public land mobile network-specific (PLMN-specific) according to an embodiment of the present disclosure.

Referring to FIG. 11, the Rx terminal receives a discovery message which has the scope field set to PLMN-specific and includes time information at operation S1100. The Rx terminal determines that the discovery message is PLMN-specific and the MCC and MNC fields are used as the time information field 1035 to carry time information at operation S1105. The Rx terminal acquires the time information from the time information field 1035 corresponding to the MCC and MNC fields at operation S1110.

After acquiring the time information, it is necessary to reuse the time information field 1035 as the MNC and MCC fields based on the PLMN information of the Tx terminal. In order for the Rx terminal to configure the MNC and MCC with the PLMN information in the discovery message, the Rx terminal determines the frequency band in which the D2D discovery is performed, i.e., a D2D discovery message is received at operation S1115. At operation S1120, the Rx terminal compares the determined frequency band and the frequency band stored in the subscriber identity module (SIM) (e.g., a universal SIM (USIM)) to acquire the information on the PLMN of the Tx terminal and extract the MCC and MNC from the PLMN information.

The Rx terminal recovers the MCC and MNC fields of the discovery message which have been used as the time information field using the MCC and MNC of the PLMN information of the Tx terminal at operation S1125.

After recovering the MCC and MNC fields, the Rx terminal performs the legacy discovery request operation at operation S1130.

In the discovery message structure proposed in an embodiment of the present disclosure, the spare field 1005 may be set to the message type field as shown in FIG. 8.

FIG. 10B is a diagram illustrating a discovery message format for distance estimation with spare, model, and MCC fields according to an embodiment of the present disclosure. In order to use only the MNC field but not MCC field, if the scope field 1005 is set to indicate country-specific scope, the time information field 1035 (legacy MCC field) can be used.

Referring to FIG. 10B, the ProSe application code field 1015 includes a scope field 1025, an E field 1030, a time information field 1035, an MNC field 1045, and a temporary identity field 1040. According to this embodiment of the present disclosure, the legacy MCC field can be uses as the time information field 1035.

In an embodiment of the present disclosure, the spare field 1005, time information field 1035 (legacy MCC field), and model field 1010 are used in order for the discovery message to carry the time information. The time information carried in the discovery message may be formatted as shown in FIG. 8.

In the case of using only the time information field 1035 (legacy MCC field), the time information field 1035 and spare field 1005 are used for the time information while the model field 1010 is used for indicating message type.

The message may be configured with the spare field 1005 indicating the message type without use of the model field 1010. In this case, the message can be generated so as to have the time information configured only with the time information field 1035.

FIG. 10C is a diagram illustrating a discovery message format for distance estimation with spare, E, MCC, and MNC fields according to an embodiment of the present disclosure.

Referring to FIG. 10C, the ProSe application code field 1015 includes a scope field 1025, an E field 1030, a time information field 1035, and a temporary identity field 1040. The E, MCC, and MNC fields are used as a time information field 1035.

In this embodiment of the present disclosure, the spare field 1005 and time information field 1035 (legacy E, MCC, and MNC fields) are used to include the time information in the discovery message. The time information included in the discovery message may be formatted as shown in FIG. 8. In the case that the scope field 1025 is set to a value reserved for future use (i.e., set to 01), the legacy E, MCC, and MNC fields may be used as the time information field 1035. The message can be generated with the spare field 1005 indicating message type and the time information field 1035 (legacy E, MCC, and MNC fields) carrying time information.

FIG. 10D is a diagram illustrating a discovery message format for distance estimation with spare field according to an embodiment of the present disclosure.

Referring to FIG. 10D, the time intervals are indexed and the indexed time information is contained in the spare field 1005 in order for the discovery message to carry the time information. The time information carried in the spare field 1005 may be inserted in the form of the indexed time information as shown in FIG. 8.

FIG. 10E is a diagram illustrating a discovery message format for distance estimation with a discovery type field according to an embodiment of the present disclosure.

Referring to FIG. 10E, in D2D communication, the discovery message the discovery type field 1000 set to 01 indicating open discovery type. In this embodiment of the present disclosure, non-open discovery type values (i.e., 00, 10, and 11) are defined to indicate new discovery types in order to configure the time information message. In this embodiment of the present disclosure, the legacy ProSe application code field is used as new message type field 1050 by defining new discovery type so as to transmit the time information message configured as shown in FIG. 8.

Figure 12:
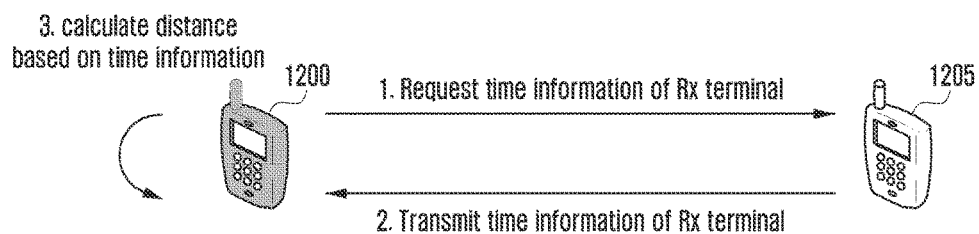
FIG. 12 is a diagram illustrating a distance calculation operation of a transmit (Tx) terminal according to an embodiment of the present disclosure.

FIG. 12 is a diagram illustrating a distance calculation operation of a Tx terminal according to an embodiment of the present disclosure. In this embodiment of the present disclosure, the discovery messages include a discovery request message and a discovery response message.

Referring to FIG. 12, an Rx terminal 1205 may provide a Tx terminal 1200 with its time information in order for the Tx terminal 1200 to estimate distance.

In order to receive the time information of the Rx terminal 1205, the Tx terminal 1200 transmits to the Rx terminal 1205 a time information request message. The time information request message may be included in the discovery request message. If the time information request message is received, the Rx terminal 1205 calculates its message processing time and transmits to the Tx terminal 1200 the message processing time information. The message processing time information may be included in the discovery response message. The Tx terminal 1200 estimates the distance between the Tx and Rx terminals 1200 and 1205 using the message processing time information received form the Rx terminal 1205.

Figure 13:
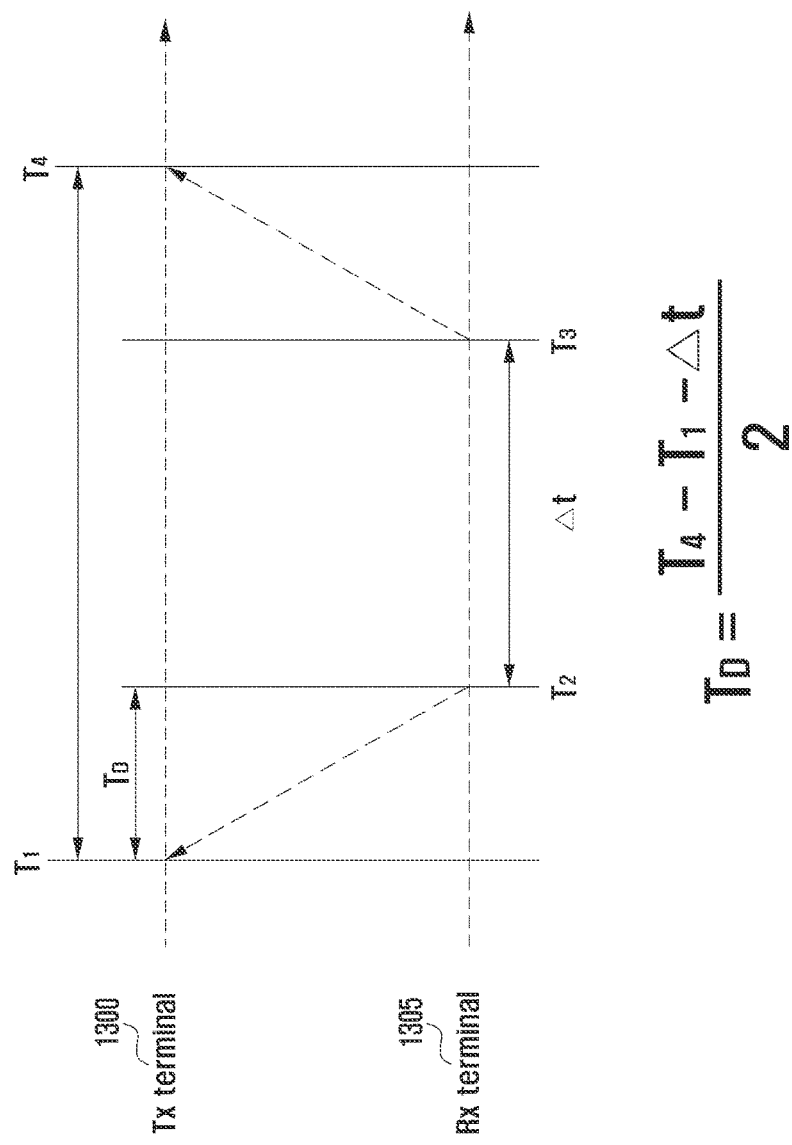
FIG. 13 is a diagram illustrating a time calculation method of a Tx terminal according to an embodiment of the present disclosure.

FIG. 13 is a diagram illustrating a time calculation method of a Tx terminal according to an embodiment of the present disclosure.

Referring to FIG. 13, a Tx terminal 1300 determines the radio resource time allocated for time information request message transmission to determine the time information request message transmission time (T1).

If an Rx terminal 1305 receives the time information request message transmitted by the Tx terminal 1300, the Rx terminal 1305 determines the time information request message reception time (T2) and stores the time information request message reception time (T2) in the memory.

The Rx terminal 1305 transmits a time information response message to the Tx terminal 1300 and determines the radio resource time allocated for time information response message transmission to determine the time information response message transmission time (T3).

The Rx terminal 1305 may calculate its time information request message processing time (Δt) based on the time information response message transmission time (T3) and the time information request message reception time (T2). The time information response message transmitted by the Rx terminal 1305 includes the time information message processing time (Δt).

The Tx terminal 1300 records the time information response message reception time (T4). The Tx terminal 1300 calculates the radio wave travel time (TD) between the Tx and Rx terminals 1300 and 1305 based on the time information response message reception time (T4), time information request message transmission time (T1), and time information message processing time as shown in Equation 3.

$$T_D = \frac{T_4 - T_1 - \Delta t}{2}$$ Equation 3

It is possible to determine the radio wave's travel distance by multiplying the radio wave travel time (TD) by the radio wave travel speed (C), thereby estimating the distance between the Tx and Rx terminal 1300 and 1305.

The distance between the Tx and Rx terminal 1300 and 1305 can be estimated using Equation 4.

$$\text{Distance} = T_D * C$$ Equation 4

Figure 14:
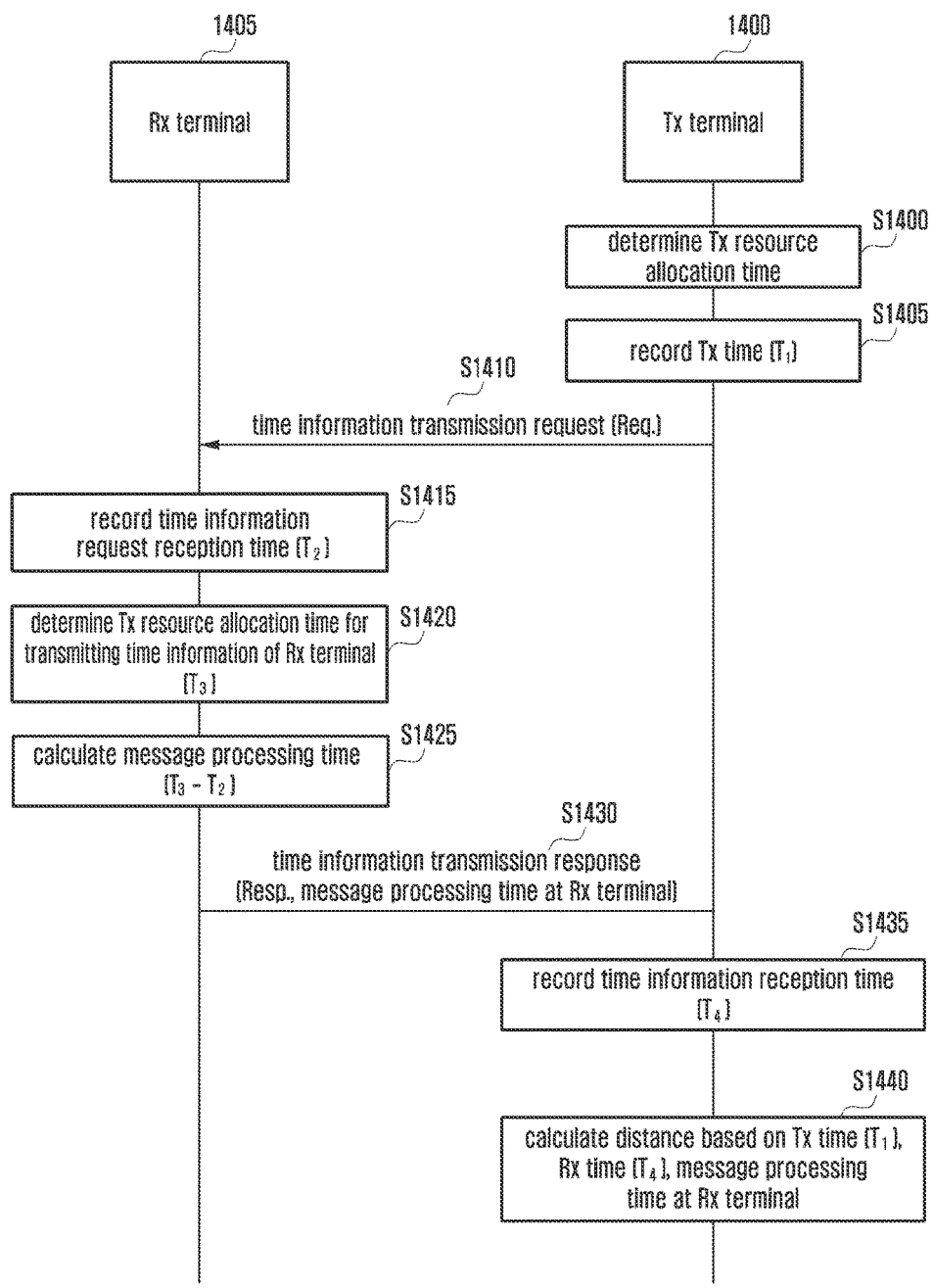
FIG. 14 is a signal flow diagram illustrating a distance calculation procedure of a Tx terminal according to an embodiment of the present disclosure.

FIG. 14 is a signal flow diagram illustrating a distance calculation procedure of a Tx terminal according to an embodiment of the present disclosure.

Referring to FIG. 14, a Tx terminal 1400 determines the radio resource time allocated for time information request message transmission to determine the time information request message transmission time at operation S1400. The Tx terminal 1400 stores the time information request message transmission time (T1) in the memory at operation S1405.

The Tx terminal 1400 transmits to an Rx terminal 1405 the time information request message having a message type field set to a value indicating time information request (e.g., a Request) at operation S1410.

If the time information request message is received, the Rx terminal 1405 stores the time information request message reception time (T2) in the memory at operation S1415.

The Rx terminal determines the radio resource time allocated for time information response message transmission to determine the time information response message transmission time (T3) at operation S1420.

The Rx terminal 1405 calculates its message processing time (T3-T2) based on the time information response message transmission time (T3) and the time information request message reception time (T2) at operation S1425.

The Rx terminal 1405 transmits to the Tx terminal 1400 the time information response message including the message type set to a value indicating the time information response message (e.g., a Response) and its message processing time at operation S1430. For example, the message may include the time information response message transmission time (T3) and the time information request message reception time (T2) instead of the message processing time.

If the time information response message is received, the Tx terminal 1400 stores the time information response message reception time (T4) in the memory at operation S1435.

The Tx terminal 1400 determines the radio wave propagation time based on the time information request message transmission time (T1), time information response reception time (T4), and Rx terminal's message processing time (T3-T2) included in the time information response message and calculates the distance between the Tx and Rx terminals 1400 and 1405 based thereon at operation S1440.

Figure 15A:
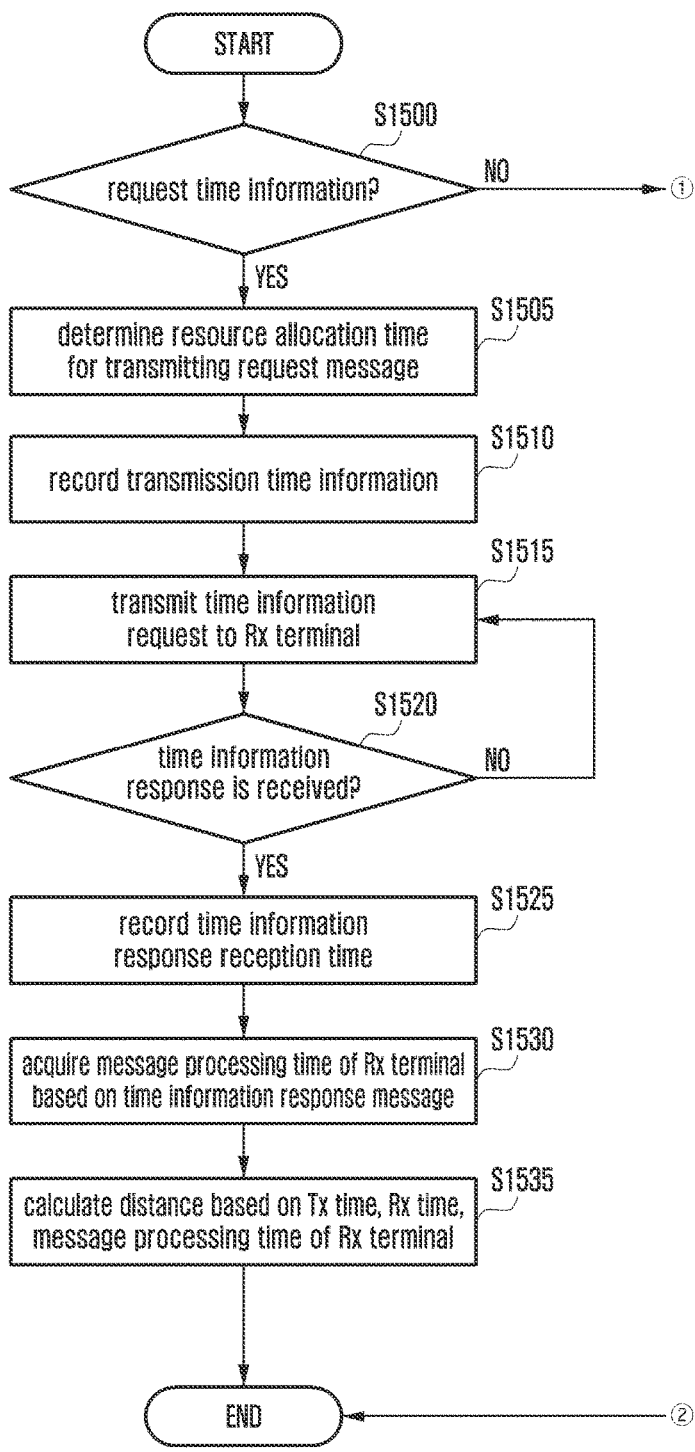
FIGS. 15A and 15B are flowcharts illustrating a time message transmission and processing procedure of a Tx terminal according to various embodiments of the present disclosure.
Figure 15B:
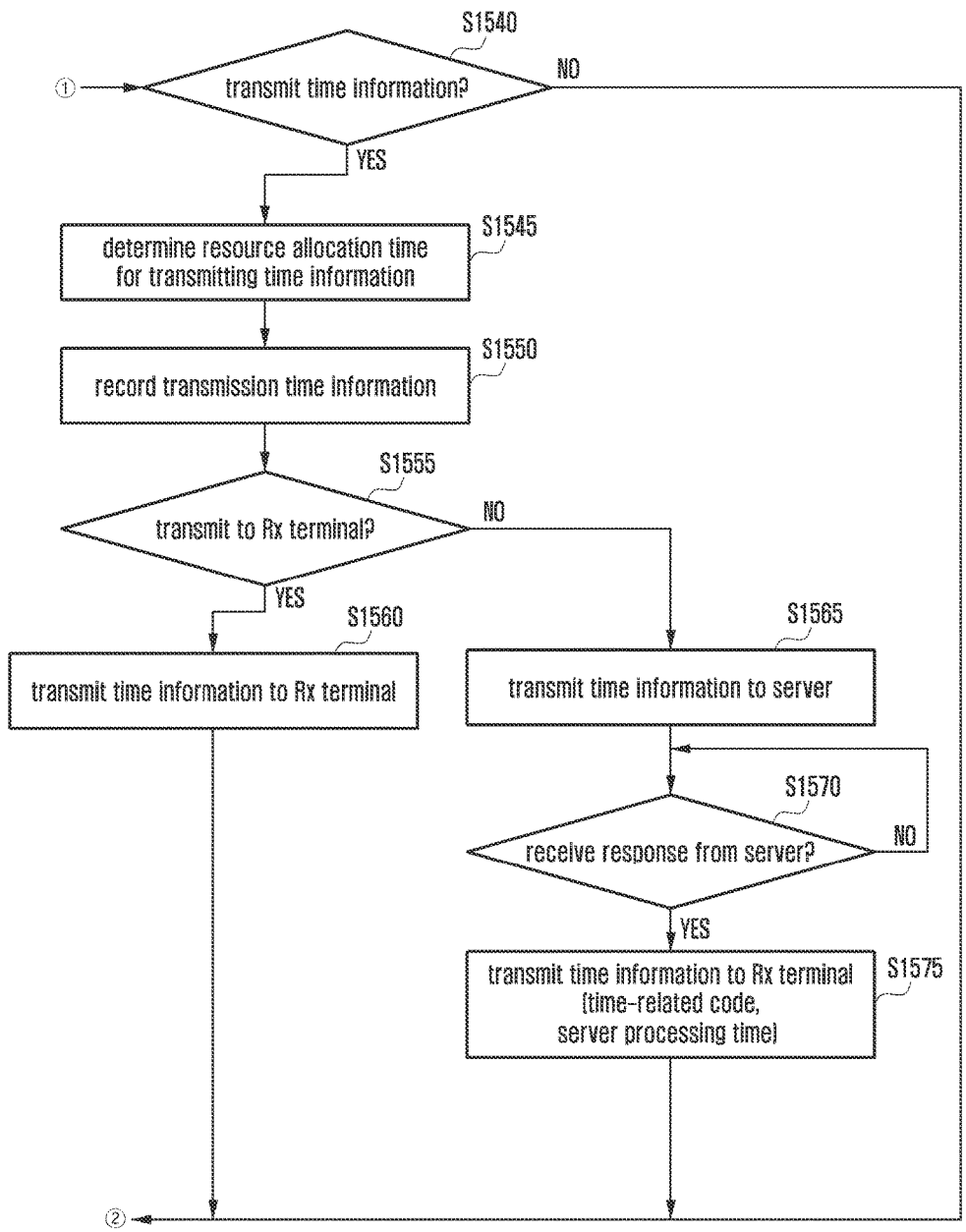

FIGS. 15A and 15B are flowcharts illustrating a time message transmission and processing procedure of a Tx terminal according to various embodiments of the present disclosure.

Referring to FIGS. 15A and 15B, the operation procedure may vary depending on whether the Tx terminal performs distance estimation or provides the Rx terminal with time information in order for the Rx terminal to perform distance estimation.

The Tx terminal determines whether to request from the Rx terminal for time information at operation S1500. If the Tx terminal is required to estimate distance, the Tx terminal determines to request from the Rx terminal for time information and determines time information request message transmission time based on the radio resource time allocated for the time information request message transmission at operation S1505. The Tx terminal stores the determined transmission time information in its memory at operation S1510. The Tx terminal transmits to the Rx terminal the time information request message at operation S1515.

The Tx terminal determines whether a time information response message is received from the Rx terminal at operation S1520. If no time information response message is received, the Tx terminal may retransmit the time information request message to the Rx terminal.

If the time information response message is received form the Rx terminal, the Tx terminal stores the time information response message reception time its memory at operation S1525.

The Tx terminal acquires the message processing time of the Rx terminal from the time information response message transmitted by the Rx terminal at operation S1530. The Tx terminal calculates the distance between the Tx and Rx terminals based on the time information request message transmission time, time information response message reception time, and message processing time of the Rx terminal at operation S1535.

If the Tx terminal is not required to estimate distance, the Tx terminal determines not to request from the Rx terminal for time information at operation S1500 and performs the procedure of FIG. 15B. The Tx terminal determines whether the Tx terminal has time information to transmit to the Rx terminal at operation S1540. If it has time information to transmit, the Tx terminal determines the radio resource time allocated for time information message transmission to determine the message transmission time at operation S1545. The Tx terminal stores the message transmission time information in its memory at operation S1550.

After storing the message transmission time information, the Tx terminal determines whether to transmit the message transmission time information to the Rx terminal or a server at operation S1555.

If it is determined to transmit the message transmission time information to the Rx terminal, the Tx terminal transmits to the Rx terminal a message including the message transmission time information at operation S1560.

If it is determined to transmit the message transmission time information to the server, the Tx terminal transmits to the server a message including the message transmission time information at operation S1565. The Tx terminal determines whether a response is received from the server at operation S1570.

If a response is received from the server, the Tx terminal determines a code related to the transmission time of the Tx terminal which is included in the response message and transmits to the Rx terminal a message including the time-related code at operation S1575.

FIG. 16 is a flowchart illustrating a time information transmission and processing procedure of an Rx terminal according to various embodiments of the present disclosure.

Referring to FIG. 16, the operation procedure may vary depending on whether the Rx terminal performs distance estimation or receives a time information request from the Tx terminal.

The Rx terminal determines whether a time information request message is received from the Tx terminal at operation S1600. If a time information request message is received from Tx terminal, the Rx terminal stores the time information request message reception time in its memory at operation S1605.

After storing the time information request message reception time, the Rx terminal determines the radio resource time allocated for time information response message transmission to determine the time information response message transmission time at operation S1610. The Rx terminal calculates its message processing time based on the time information response message transmission time and the time information request message reception time at operation S1615.

The Rx terminal transmits to the Tx terminal the time information response having the message type field is set to a value indicating the time information response message (e.g., a Response) and time information including the Rx terminal's message processing time or the time information response message transmission time and time information request message reception time at operation S1620.

If the Rx terminal is required to perform distance estimation, the Rx terminal may not receive the time information request message at operation S1600. In this case, if the Tx terminal transmits a message, the Rx terminal determines whether the message includes time information at operation S1625. If the time information message is received, the Rx terminal determines and stores the message reception time at operation S1630. The Rx terminal determines whether the message received from the Tx terminal includes a time-related code at operation S1635. If the message includes the time-related code, the Rx terminal transmits to the server the time-related code at operation S1640. The Rx terminal determines whether the Tx terminal's message transmission time information corresponding to the time-related code is received from the server S1645. If not transmission time information is received from the server, the Rx terminal may retransmit the time-related code to the server. If the transmission time information corresponding to the time-related code is received from the server, the Rx terminal calculates the distance between the Tx and Rx terminals based on the Tx terminal's transmission time information and the reception time information stored in the memory of the Rx terminal at operation S1650. If the message includes no time-related code, i.e., if the received time information is the message transmission time of the Tx terminal, the Rx terminal calculates the distance between the Tx and Rx terminals based on the message transmission time included in the received message and the message reception time stored in the memory of the Rx terminal at operation S1655.

According to various embodiments of the present disclosure, the technique of estimating distance between the Tx and Rx terminals may be applicable to various radio communication systems in addition to the above described D2D communication system. The Rx terminal acquires time synchronization with the Tx terminal and acquires message transmission time at the Tx terminal and message reception time at the Rx terminal to calculate distance between the Tx and Rx terminals.

In the radio communication system including the Tx terminal acquired absolute reference time synchronization, the Tx terminal transmits to the Rx terminal a message including the absolute reference time information in order for the Rx terminal to acquire absolute time synchronization with the Tx terminal and transmits to the Rx terminal a message including the transmission time information in order for the Rx terminal to calculate distance from the Rx terminal based on the transmission time information.

Figure 20:
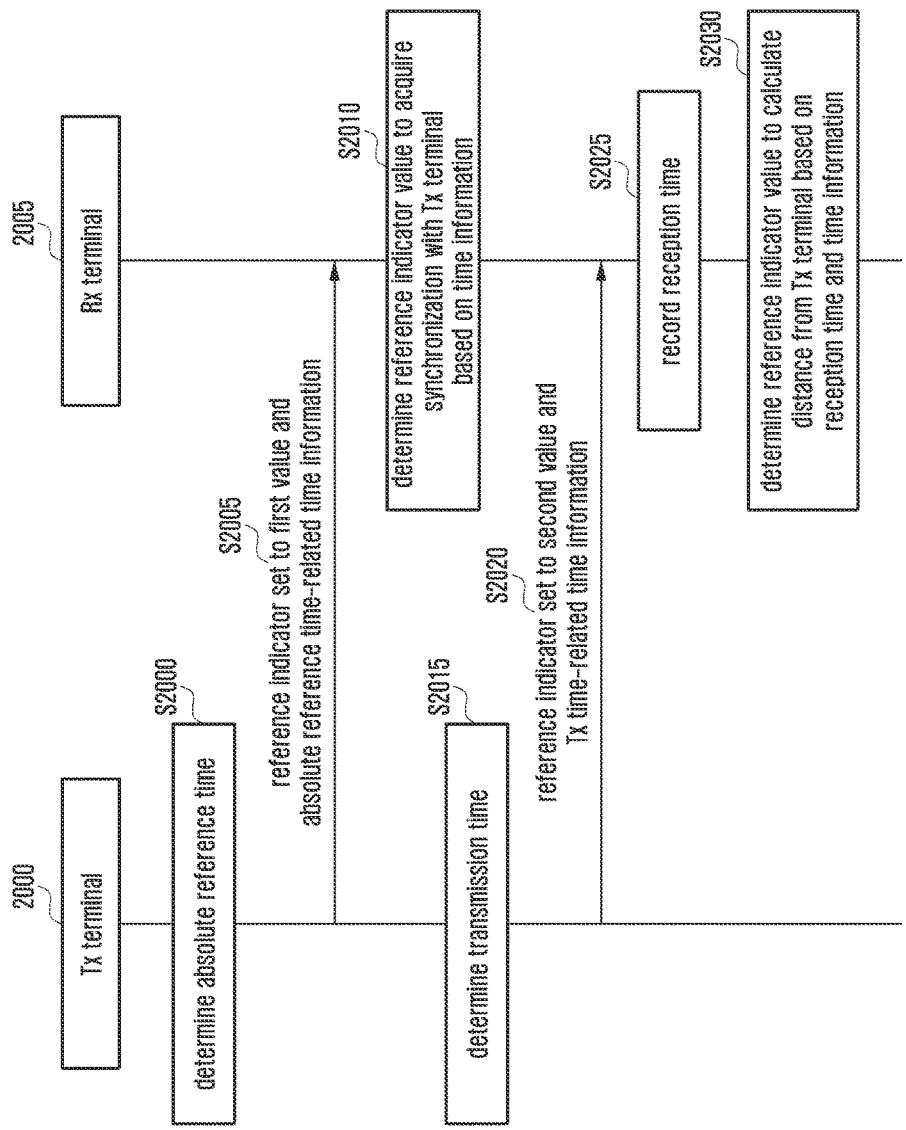
FIG. 20 is a signal flow diagram illustrating a method for an Rx terminal to calculate a distance from a Tx terminal in a wireless communication system in which the Tx terminal has acquired absolute reference time synchronization according to an embodiment of the present disclosure.

FIG. 20 is a signal flow diagram illustrating a method for an Rx terminal to calculate a distance from a Tx terminal in a wireless communication system in which the Tx terminal has acquired absolute reference time synchronization according to an embodiment of the present disclosure.

Referring to FIG. 20, a Tx terminal 2000 determines the absolute reference time at operation S2000. For example, the Tx terminal 2000 acquires the absolute reference time from the system information broadcast by the base station to acquire synchronization.

A Tx terminal 2000 transmits to an Rx terminal 2005 a message including a reference indicator and time information at operation S2005. The reference indicator may be set to a first value indicating that the included time information relates to the absolute reference time. The time information related to the absolute reference time may be a value corresponding to the absolute reference time measured by the Tx terminal 2000 or a value obtained by applying a margin time (e.g., a processing time at the Rx terminal) to the absolute reference time.

At operation S2010, the Rx terminal 2005 determines the reference indicator included in the received message and, if the reference indicator is set to the first value, acquires synchronization with the Tx terminal using the absolute reference time. For example, if the reference indicator is set to the first value, the Rx terminal is capable of acquiring synchronization with the Tx terminal based on the absolute reference time.

The Tx terminal 2000 determines the transmission time for transmitting the message at operation S2015.

The Tx terminal 200 transmits to the Rx terminal 2005 the message including the reference indicator and time information at the transmission time at operation S2020. The time information may include the time related to the transmission time. At this time, the reference indicator may be set to a first value indicating inclusion of time information related to the transmission time.

The Rx terminal 2005 determines and stores the message reception time at operation S2025.

At operation S2030, the Rx terminal 2005 determines the reverence indicator included in the received message and, if the reference indicator is set to the second value, calculates the distance from the Tx terminal based on the time information. For example, if the reference indicator is set to the second value, the Rx terminal is capable of calculating the distance from the Tx terminal using the time information related to the transmission time and the message reception time at operation S2025. For more detail, see Equations 1 and 2.

Figure 21:
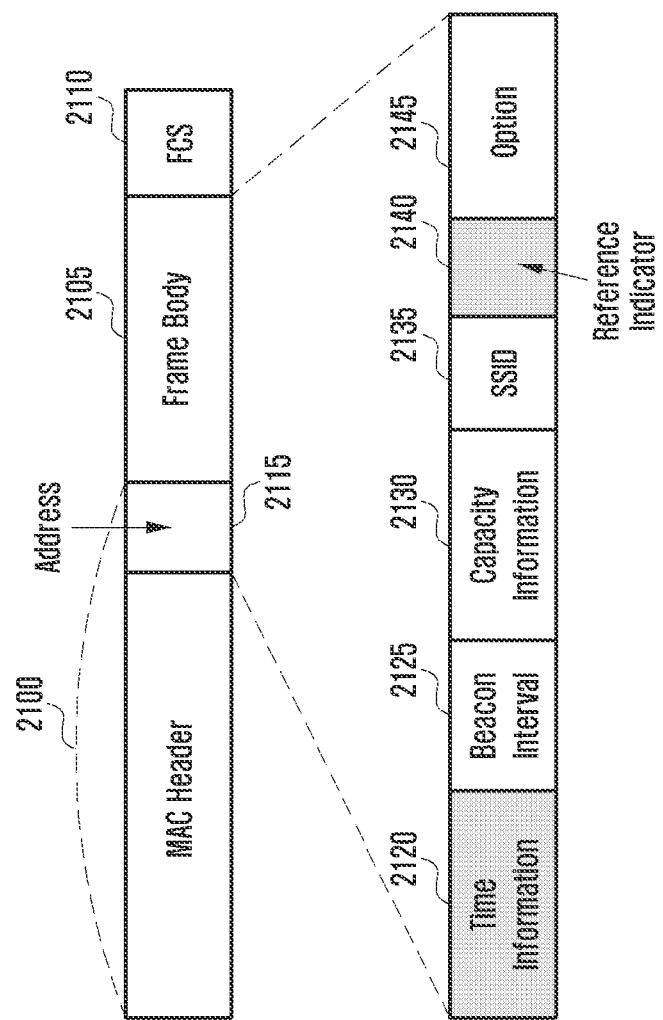
FIG. 21 is a diagram illustrating a format of a beacon message for use in transmitting time information according to an embodiment of the present disclosure.
Figure 22:
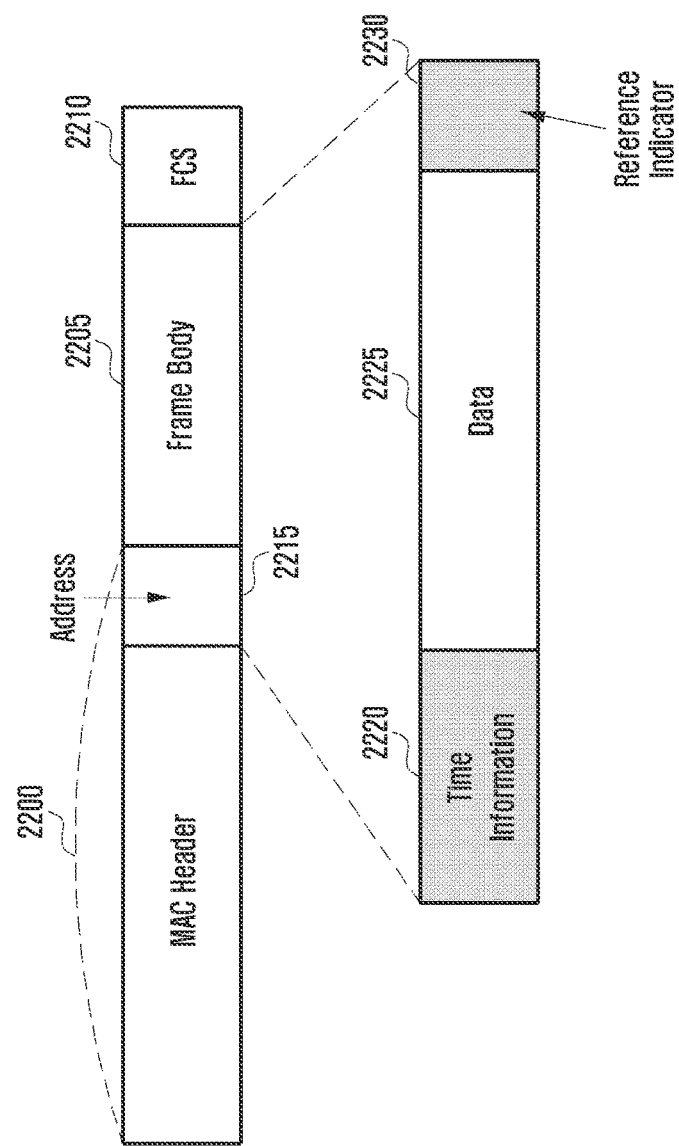
FIG. 22 is a diagram illustrating a format of a data message for use in transmitting time information according to an embodiment of the present disclosure.

FIGS. 21 and 22 are diagrams illustrating message formats for use in estimating distance between the Tx and Rx terminals according to various embodiments of the present disclosure. Although FIGS. 21 and 22 are directed to the cases of using a field of a message of the Wi-Fi system, the present disclosure is not limited thereto but may be applicable to all the types of radio communication systems using similar types of messages.

FIG. 21 is a diagram illustrating a format of a beacon message for use in transmitting time information according to an embodiment of the present disclosure. The beacon message is transmitted periodically. According to an embodiment of the present disclosure, the absolute time and/or transmission time information may be transmitted using the beacon message.

Referring to FIG. 21, a beacon frame includes the information for maintaining the system periodically. For example, the beacon frame includes a media access control (MAC) header 2100, a frame body 2105, and a frame check sequence (FCS) 2110.

The MAC header 2100 includes basic information for maintaining the frame. The MAC header 2100 includes an address field 2115 containing the information for use at the Rx terminal in identifying the Tx terminal.

The frame body 2105 includes a time information field 2120, a beacon interval field 2125, a capacity information field 2130, a service set ID (SSID) field 2135, a reference indicator field 2140, and an option field 2145.

The time information field 2120 may include absolute reference time-related information or message transmission time information for distance measurement. The value of the reference indicator field 2140 is determined differently depending on whether the time information field 2120 includes the absolute reference time-related information or message transmission time information. The beacon interval field 2125 includes beacon frame transmission period (time interval) information, and the capacity information field 2130 includes the listen interval information, i.e., the information on the awakened time duration for listening to the beacon frame.

In an embodiment of the present disclosure, if the beacon frame is received, the Rx terminal determines the value of the reference indicator field. If the reference indicator is set to the first value (e.g., 1), this indicates that the time information field carries the absolute reference time-related information and thus the Rx terminal acquires synchronization with the Tx terminal using the absolute reference time-related information. Otherwise, if the reference indicator is set to the second value (e.g., 0), this indicates that the time information field includes the message transmission time-related information and thus the Rx terminal calculates the distance from the Tx terminal using the message transmission time-related information.

When acquiring synchronization with the Tx terminal, the Rx terminal may use the absolute reference time-related information received first and ignore other absolute reference time-related information being received in a certain time. If necessary, the Tx terminal may use the option field 2145 to transmit to the MNC and MCC in order for the Rx terminal to acquire the PLMN-specific absolute time-related information based on the MNC and MCC. The absolute reference time-related information may be the absolute reference time value measured by the Tx terminal or a value acquired by applying a margin time (e.g., a processing time at the Rx terminal) to the absolute reference time.

The method proposed in the present disclosure may be applied to a data message as well as the beacon message.

FIG. 22 is a diagram illustrating a format of a data message for use in transmitting time information according to an embodiment of the present disclosure.

Referring to FIG. 22, the absolute time and/or transmission time-related information may be transmitted using the data message. The data frame carries data. For example, the data frame includes a MAC Header 2200, a frame body 2205, and an FCS 2210.

The MAC Header 2200 includes basic information for maintaining the frame. The MAC Header 2200 includes an address field 2215 containing the information for use at the Rx terminal in identifying the Tx terminal.

The frame body 2205 includes a time information field 2220, a data field 2225, and a reference indicator field 2230.

The time information field 2220 may include absolute reference time-related information or message transmission time information for use in distance measurement. The value of the reference indicator field 2230 is determined differently depending on whether the time information field 2220 includes the absolute reference time-related information or message transmission time information.

The Tx terminal may transmit the absolute time information and transmission time information using the beacon and data message respectively. The Tx terminal which has occupied the channel may transmit the beacon message including the absolute time information and the data message including the transmission time-related information for distance estimation.

If the beacon frame or data frame is received, the Rx terminal determines the value of the reference indicator field. If the reference indicator is set to the first value (e.g., 1), this indicates that the time information field carries the absolute reference time-related information and thus the Rx terminal acquires synchronization with the Tx terminal using the absolute reference time-related information. Otherwise, if the reference indicator is set to the second value (e.g., 0), this indicates that the time information field includes the message transmission time-related information and thus the Rx terminal calculates the distance from the Tx terminal using the message transmission time-related information. The absolute reference time-related information may be the absolute reference time value measured by the Tx terminal or a value acquired by applying a margin time (e.g., a processing time at the Rx terminal) to the absolute reference time.

If the message transmission time-related information is received in the state that the Rx terminal has already acquired time synchronization with the Tx terminal, the Rx terminal calculates distance from the Tx terminal. However, if the message transmission time-related information is received without achieving time synchronization with the Tx terminal, the Rx terminal may not calculate distance from the Tx terminal.

Figure 23:
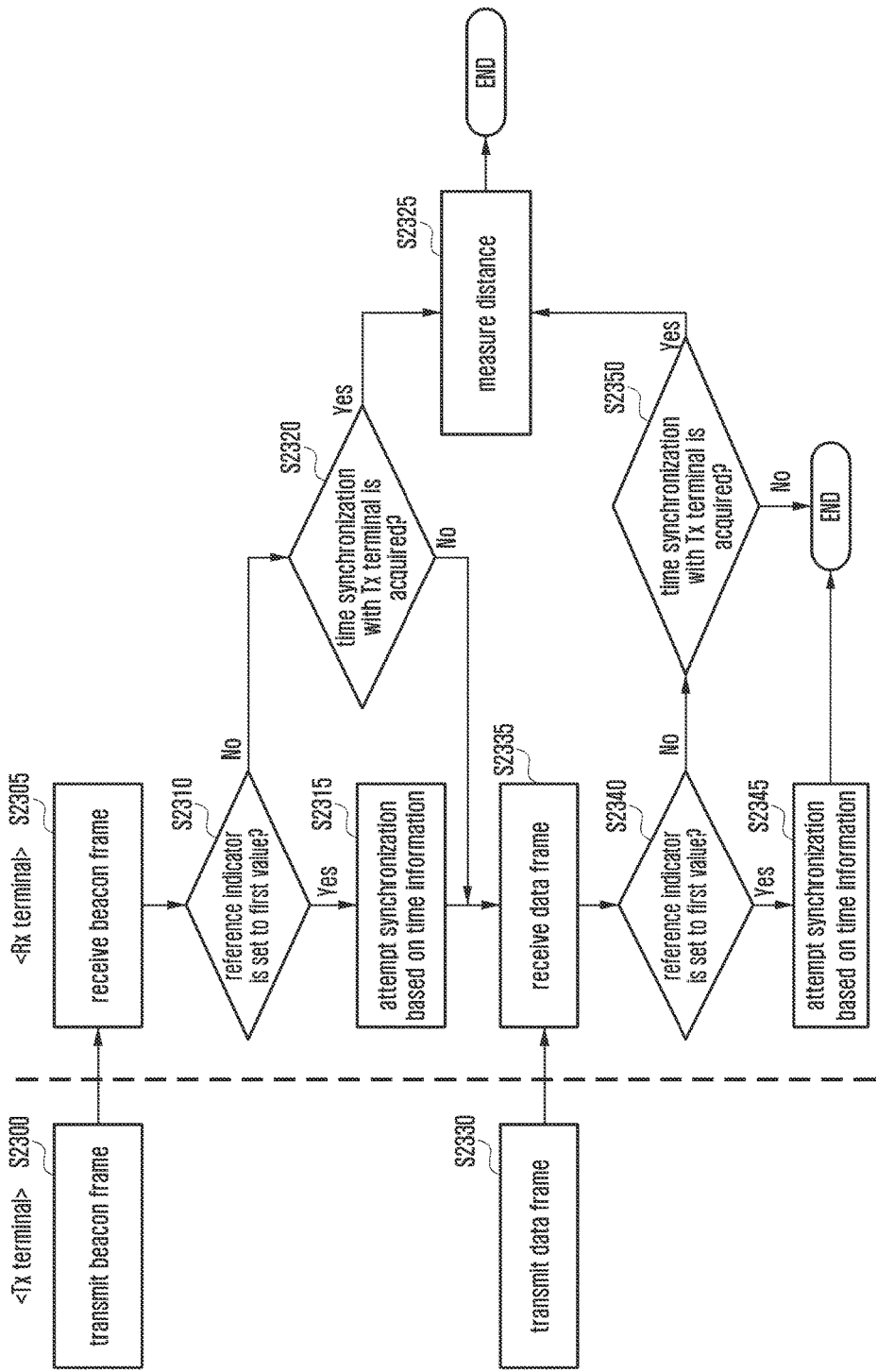
FIG. 23 is a flowchart illustrating a method of calculating a distance between Tx and Rx terminals using a beacon frame and/or data frame according to an embodiment of the present disclosure.

FIG. 23 is a flowchart illustrating a method of calculating a distance between Tx and Rx terminals using a beacon frame and/or data frame in a Wi-Fi system according to an embodiment of the present disclosure.

Referring to FIG. 23, the Tx terminal transmits to the Rx terminal the beacon frame formatted as shown in FIG. 21 at operation S2300. The Rx terminal receives the beacon frame transmitted by the Tx terminal at operation S2305.

The Rx terminal determines the reference indicator field of the received beacon frame to determine whether the reference indicator is set to the first value at operation S2310. If the reference indicator is set to the first value, the Rx terminal attempts to acquire synchronization with the Tx terminal based on the absolute reference time-related information included in the time information field at operation S2315. Otherwise, if the reference indicator is not set to the first value, the Rx terminal determines whether it has acquired synchronization with the Tx terminal at operation S2320. If the Rx terminal has acquired synchronization with the Tx terminal, the Rx terminal calculates distance from the Tx terminal based on the time information (e.g., a beacon message transmission time) included in the time information field at operation S2325.

Meanwhile, the Tx terminal transmits to the Rx terminal a data frame formatted as shown in FIG. 22 at operation S2330. The Rx terminal receives the data frame transmitted by the Tx terminal at operation S2335.

The Rx terminal determines the reference indicator field of the received data frame to determine whether the reference indicator is set to the first value at operation S2340. If the reference indicator is set to 1, the Rx terminal attempts to acquire synchronization with the Tx terminal based on the absolute reference time-related information included in the time information field at operation S2345. Otherwise, if the reference indicator is not set to the first value, the Rx terminal determines whether it has acquired synchronization with the Tx terminal at operation S2350. If the Rx terminal has acquired synchronization with the Tx terminal, the Rx terminal calculates distance from the Tx terminal based on the time information (e.g., a beacon message transmission time) included in the time information field at operation S2325.

As described above, the Rx terminal can calculate the distance from the Tx terminal connected through one of various radio communication system. For example, the Rx terminal may output Tx terminal-specific information in an order of distance-based priorities.

FIG. 24A is a diagram illustrating an Rx terminal to output voice data of Tx terminals based on distance information according to an embodiment of the present disclosure.

Referring to FIG. 24A, the Rx terminal owned by the user calculates distances from Rx terminals 2400 to 2410 connected through various types of radio communication systems using the above-described method, assigns priorities to the Tx terminal-specific information based on the calculated distances, and outputs Tx terminal-specific data (e.g., voice data) in an order of priorities.

More specifically, in the state that the Rx terminal is displaying screen data (e.g., video and image data) received from Tx terminals 2400, 2405, and 2410 that are located 50 m, 150 m, and 300 m away respectively from the Rx terminal, the Rx terminal outputs the Tx terminal data (e.g., voice data) related to the screen data received from the closest Tx terminal 2400 with priority and the Tx terminal data (e.g., voice data) from the Tx terminals 2405 and 2410 subsequently. The Rx terminal may assign the priority to the closest Tx terminal or farthest Tx terminal with or without consideration of other factors (e.g., type of data (i.e., advertisement, news, event, and the like)).

According to various embodiments of the present disclosure, the Rx terminal may output the Tx terminal-specific data in an order or types of output devices of the Rx terminal (e.g., a display, audio, light, a vibration, and the like).

Figure 24B:
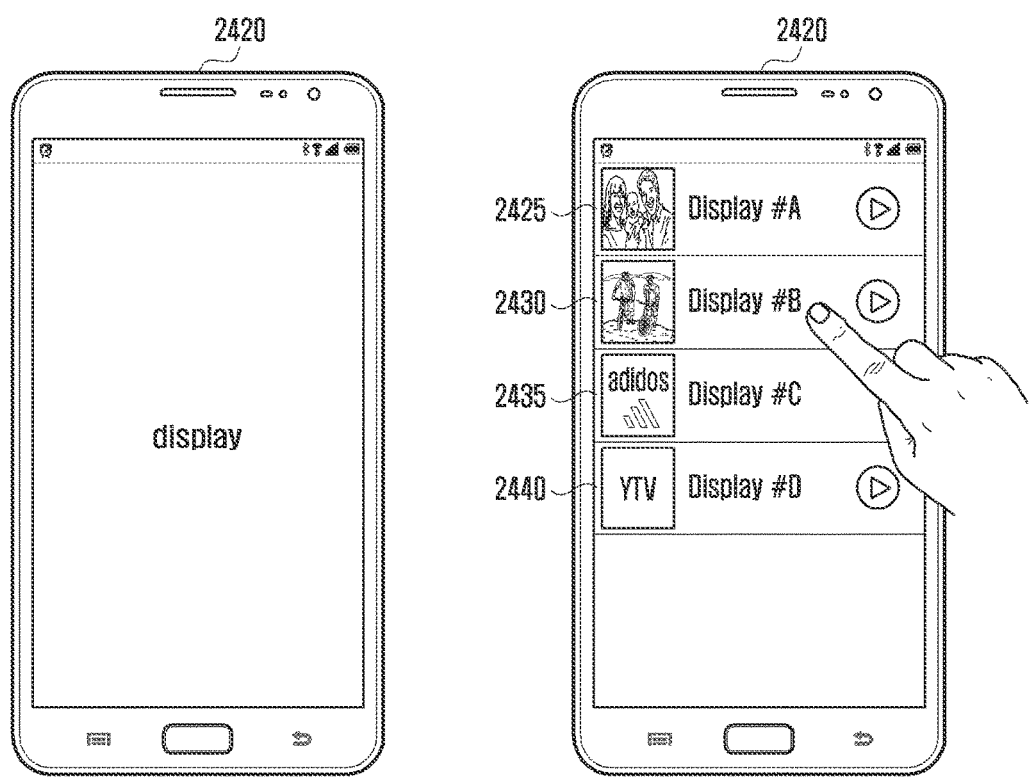
FIG. 24B is a diagram illustrating output manipulation on an Rx terminal with a display (i.e., a screen) displaying screen data according to an embodiment of the present disclosure.

FIG. 24B is a diagram illustrating output manipulation on an Rx terminal with a display (i.e., a screen) displaying screen data according to an embodiment of the present disclosure, and FIG. 24C is a diagram illustrating output manipulation on an Rx terminal without any display according to an embodiment of the present disclosure.

Referring to FIG. 24B, the Rx terminal may include a display 2420 which displays a plurality of information items 2425 to 2440 related to the Tx terminals connected through a wireless communication system in an order of priorities determined based on distance. For example, the Rx terminal may receive the data (e.g., video data, image data, and voice data) from a plurality of Rx terminals and display the information items 2425 to 2440 of the Tx-terminal specific data on the display 2420 in an order of priorities. If an input is made by the user to select one of the information items, the Rx terminal executes the data corresponding to the selected information item.

For example, the Rx terminal may receive the Tx terminal-specific data (e.g., voice data) from the plural Tx terminals as shown in FIG. 23 and display the information items representing the Tx terminal-specific data (e.g., voice data) on the display 2420.

The Rx terminal may receive a signal requesting for output of the data (e.g., voice data) received form the plural Tx terminals. At this time, the signal may include an application execution request a uniform resource locator (URL) input at a web browser. For example, if at least one Tx terminal is found near the Rx terminal, the Rx terminal outputs a notification on the display 2420 to notify of the detection of at least one Tx terminal and, if the notification is selected, detects the selection input signal. The Rx terminal may display a notification window at the top area of the screen to notify of the detection of the Tx terminal. The notification window may present necessary information including a number of found Tx terminals. In addition, the Rx terminal may display a popup window on a display area or outputs a light emission or vibration to notify of the detection of the Tx terminal.

If a signal input requesting for output of the Tx terminal-specific data (e.g., voice data) is detected, the Rx terminal may display a list of information items 2425 to 2440 corresponding to the Tx terminal-specific data in a web browser screen, a lock screen, or a specific application screen on the display 2420. For example, the Rx terminal may output the list of information items 2425 to 2440 based on the video information related to the Tx terminal-specific data (e.g., voice data) received from the plural Tx terminals. The list of information items 2425 to 2440 may include at least one of thumbnail image, title, and abstract of the video information, and ID of the Tx terminal.

The Rx terminal may not have a display and thus, the Rx terminal may output the information received from the plural Tx terminals connected through a radio communication system at another output device (e.g., audio, light source, and vibration motor) in an order of priorities determined based on distances from the Tx terminals. For example, the Rx terminal may receive the Tx terminal-specific data (e.g., voice data) from a plurality of Tx terminals and output the voice data at the audio in an order of priority in response to the user input.

Referring to FIG. 24C, the Rx terminal may include an input device 2450 which is implemented in one of capacitive type, resistive type, button type, and dial type, and the Rx terminal may further include additional sensors or devices depending on the embodiment.

For example, if a signal requesting for outputting Tx terminal data (e.g., voice data) is input at the input device 2450, the Rx terminal outputs the Tx terminal-specific data (e.g., voice data) received from the respective Tx terminals in an order of priorities determined based on the distances from the Tx terminals according to various embodiments. If an auxiliary device (e.g., a camera, an infrared sensor, a gyro sensor, a magnetic device, a display, and the like) is connected to the Rx terminal, the Rx terminal may output a list of the Tx terminal-specific data using the auxiliary device. Here, the signal may be input at the auxiliary device capable of recognizing a user's gaze, a touch, a face, and the like.

The Rx terminal may receive a signal input made at the input device 2450 to request for outputting the Tx terminal-specific data (e.g., voice data). The signal input may be made on the input device 2450 in various ways.

As denoted by reference number 2460, the Rx terminal may detect a slide gesture made on the input device 2450. For example, the Rx terminal may display the data of the next Tx terminal in response to a right direction slide gesture and the data of the previous Tx terminal in response to a left direction slide gesture.

As denoted by reference number 2465, the Rx terminal may detect a touch gesture made on the input device 2450. For example, the Rx terminal may display data of the next Tx terminal in response to a short touch gesture of which contact time is shorter than a certain time and data of the previous Tx terminal in response to a long touch gesture of which contact time is longer than the certain time.

As denoted by reference number 2470, the Rx terminal may count a number of touch points of the touch gesture made on the input device 2450. For example, the Rx terminal may display data of the next Tx terminal in response to a single touch gesture and data of the previous Tx terminal in response to a multi-touch gesture.

As denoted by reference number 2475, the Rx terminal may detect a rotation direction of the input device 2450 provided in the form of a dial. For example, the Rx terminal may display data of the next Tx terminal in response to the clockwise direction rotation of the dial and data of the previous Tx terminal in response to the counterclockwise direction rotation of the dial.

In the content navigation methods according to the above embodiments of the present disclosure, the Tx terminal-specific data selection operation based on the slide direction, contact time of the touch gesture, number of contact points of the touch gesture, and dial rotation direction and speed may be configured by the system or the user. The Rx terminal may output the name of the content or Tx terminal in voice when the voice data content is changed. In addition, when there is no more contents to output, the Rx terminal may return to the first content or output an announcement sound.

The Rx terminal may receive a signal input to request for storing the content being currently output at the input device 2450. For example, the Rx terminal may regard the touch gesture made longer than a certain time in an input area as the request for storing the content. In addition, the Rx terminal may regard a touch gesture having a certain number of touch points as the request for storing the content.

Figure 17:
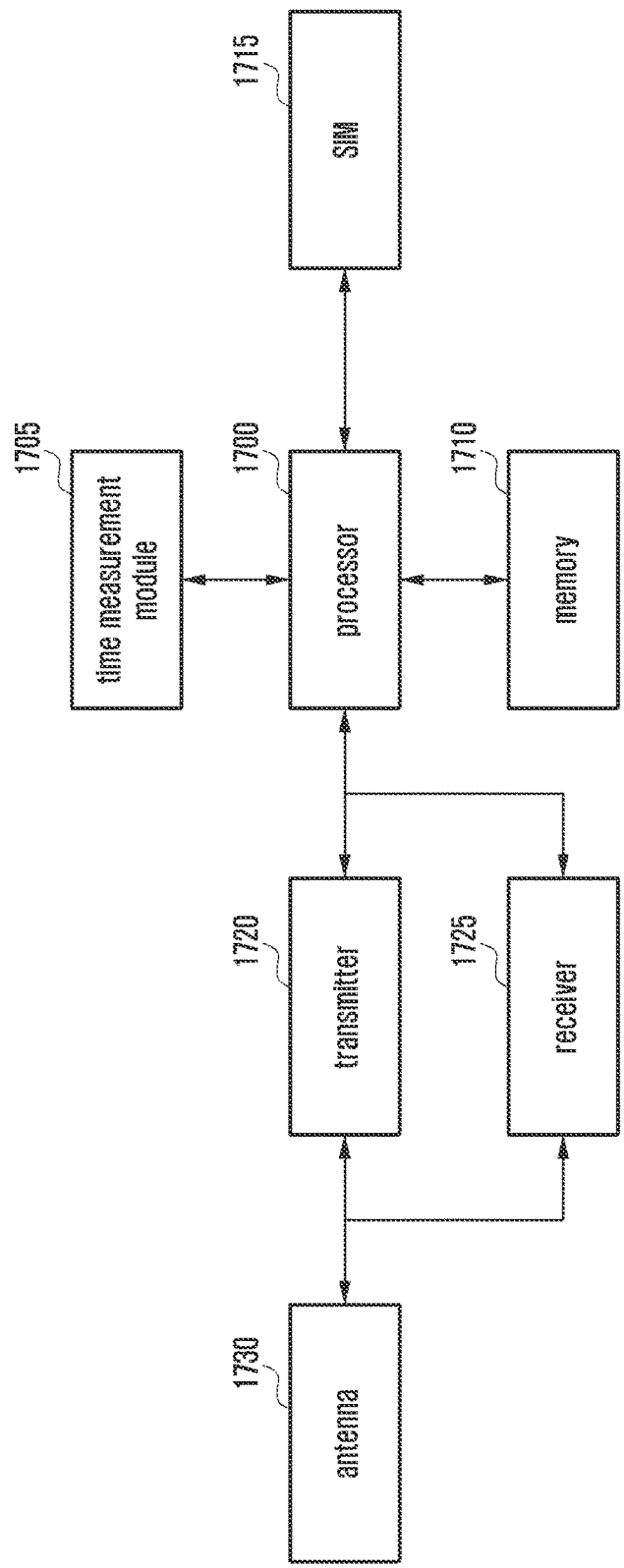
FIG. 17 is a block diagram illustrating a configuration of a terminal according to various embodiments of the present disclosure.

FIG. 17 is a block diagram illustrating a configuration of a terminal according to various embodiments of the present disclosure. The terminal depicted in FIG. 17 can accomplish the above-described operations mechanically.

Referring to FIG. 17, the terminal according includes a processor 1700, a time measurement module 1705, a memory 1710, a SIM 1715, a transmitter 1720, a receiver 1725, and an antenna 1730.

The processor 1700 may perform distance calculation according to various embodiments of the present disclosure.

The time measurement module 1705 may measure the request message transmission and reception times.

The memory 1710 may store the message transmission and reception times measured by the time measurement module 1705 and the distance information which the processor 1700 calculates based on the time information.

The SIM 1715 may store the operator information to determine MNC and MCC of the operator for the Tx terminal which transmits a discovery message.

The transmitter 1720 and receiver 1725 may transmit/receive time information for distance estimation and calculated distance information according to various embodiments of the present disclosure.

The antenna 1730 may transmit and receive radio signals carrying messages.

Although not depicted in the drawing, the terminal according to an embodiment of the present disclosure may further include an input device (e.g., an input device 2450 of FIG. 24C) for receiving a user input and an output device including a display (e.g., a display 2420 of FIG. 24B) for outputting data.

Figure 18:
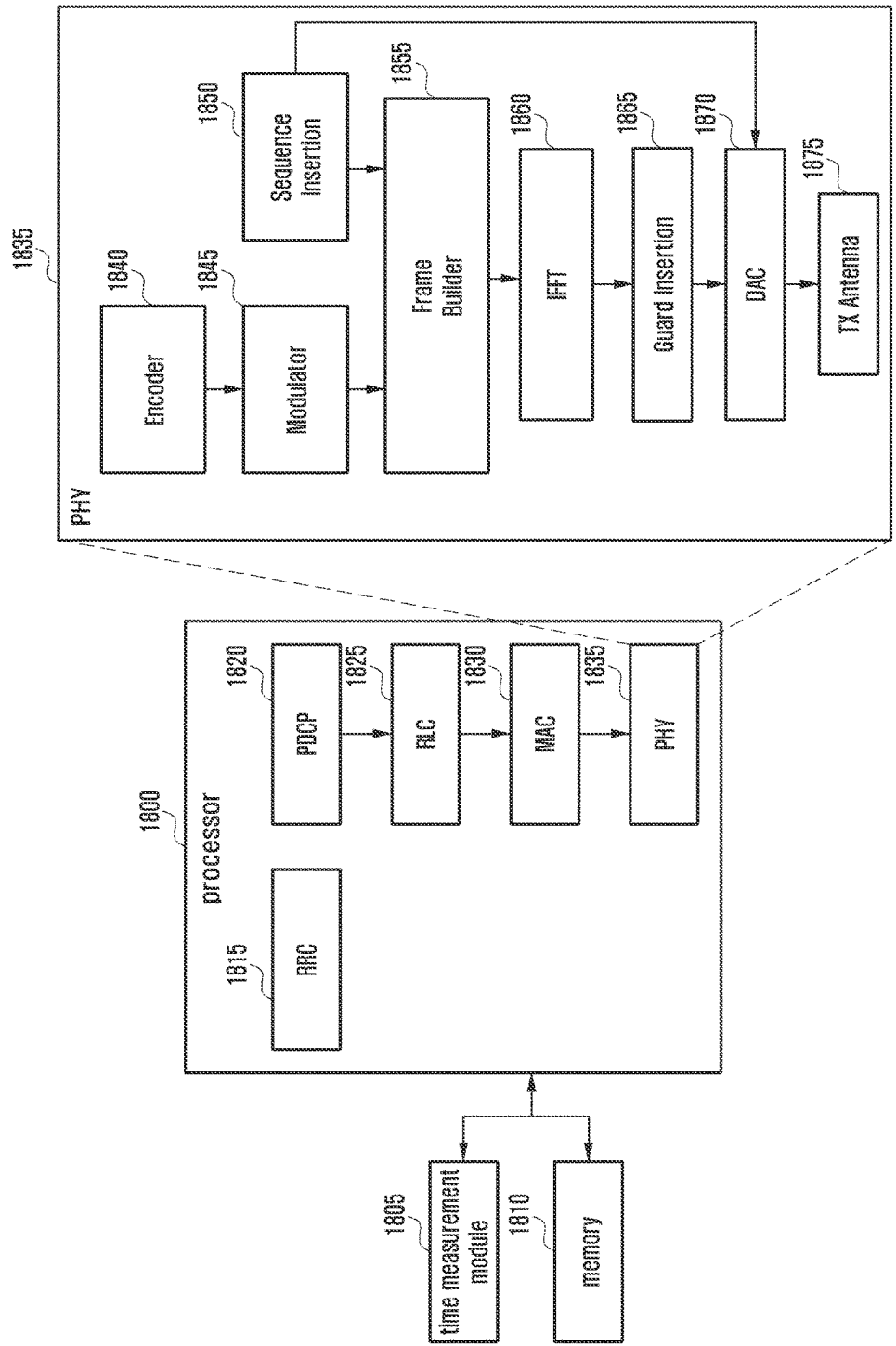
FIG. 18 is a diagram illustrating an operation time-measurable part of a Tx terminal according to an embodiment of the present disclosure.

FIG. 18 is a diagram illustrating an operation time-measurable part of a Tx terminal according to an embodiment of the present disclosure.

Referring to FIG. 18, the transmission time recoding part of the Tx terminal may be implemented with application to physical layers.

According to various embodiments of the present disclosure, the transmission time may be measured based on a message or a specific signal. The message-based time measurement is characterized in that the time information is carried in a message, and the specific signal-based time measurement is characterized by using the pilot signal or sequence signal.

FIG. 18 illustrates an operation time-measurable part of the Tx terminal on layer 2 or layer 1. The layer 2 may include a radio resource control (RRC) layer 1815, a packet data convergence protocol (PDCP) layer 1820, a radio link control layer (RLC) 1825, and a MAC layer 1830.

The layer 1 may be a physical (PHY) layer 1835 including an encoder 1840 which is responsible for channel coding and rate matching for data transmission, a modulator 1845, a sequence insertor 1850, a frame builder 1855, an inverse fast fourier transformer (IFFT) 1860, a guard inserter 1865, a digital to analog converter (DAC) 1870, and a Tx antenna 1875.

According to an embodiment of the present disclosure, if the Tx discovery message includes a time-related information part, at least one layer 2 function notifies a processor 1800 of the activation the corresponding function such that the processor 1800 measures the execution time of the corresponding function at a time measurement module 1805 and records the operation time (transmission time at the Tx terminal) and compensation time for assisting the radio wave delay calculation after the operation time of the corresponding time in a memory 1810.

In the case that the RRC layer 1815 records the transmission time in the time-related information part of the discovery message, if the RRC layer 1815 is operating in the state of transmitting the discovery message, the RRC layer 1815 notifies the processor 1800 of the RRC operation such that the processor 1800 determines the time at the time measurement module 1805 and records the time in the memory 1810. In the case of recording the operation time of the corresponding function (message transmission time at the Tx terminal), the processor 1800 calculates the processing time after the RRC operation as compensation time value and stores the compensation time value in the memory 1810 to help compute radio wave propagation time.

According to an embodiment of the present disclosure, the time measurement operation on the layer 1 is similar to the operation on the layer 2. For example, in the case that the modulator 1845 measures and records time, if the modulator 1845 operates, this is notified to the processor 1800 such that the processor 1800 measure the time at the time measurement module 1805 and stores the modulator operation time in the memory 1810.

In the case that the operation time of the modulator 1945 is recorded in the memory 1810, the processor 1800 stores the processing time for the operation after the operation time of the modulator 1845 as a compensation time value in the memory 1810 for use in calculating the radio wave propagation time.

According to various embodiments of the present disclosure, the transmission time measurement may be performed on layer 2 or layer 1. For example, the transmission time may be measured on any of PDCP layer 1820, RLC layer 1825, MAC layer 1830, and PHY layer 1835 and, in this case, the compensation time for use in calculating the radio wave propagation time is counted since the operation time of the corresponding function.

Figure 19:
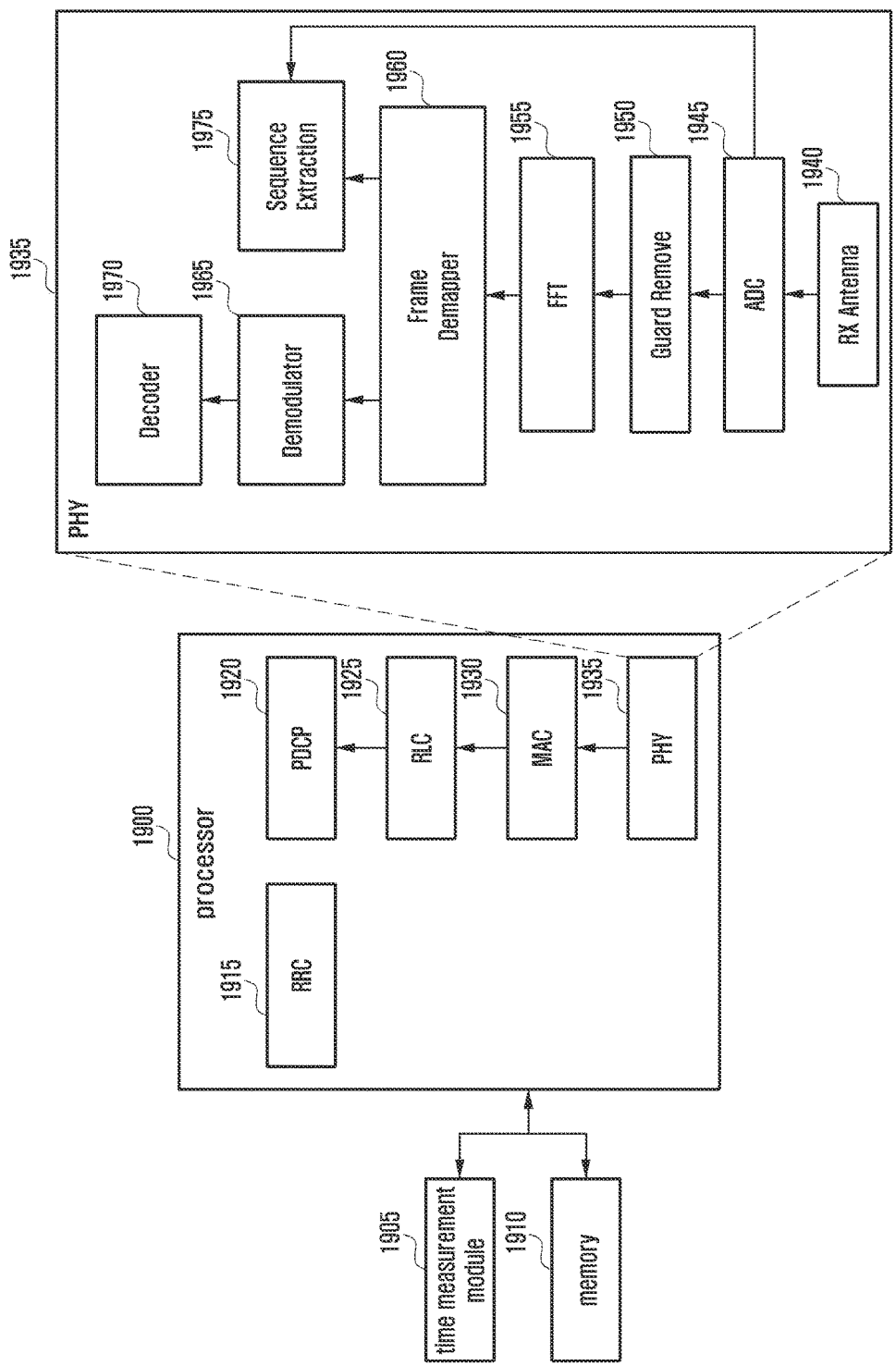
FIG. 19 is a diagram illustrating an operation time-measurable part of an Rx terminal according to an embodiment of the present disclosure.

FIG. 19 is a diagram illustrating an operation time-measurable part of an Rx terminal according to an embodiment of the present disclosure.

Referring to FIG. 19, the reception time recording-available part includes application to physical layers in the Rx terminal.

According to various embodiments of the present disclosure, the reception time may be measured based on a message or a specific signal. The message-based time measurement is characterized in that the time information is carried in a message, and the specific signal-based time measurement is characterized by using the pilot signal or sequence signal.

FIG. 19 illustrates an operation time-measurable part of the Rx terminal on layer 2 or layer 1. The layer 2 may include an RRC layer 1915, a PDCP layer 1920, an RLC layer 1925, and a MAC layer 1930.

The layer 1 may be a PHY layer 1935 including a decoder 1970 which is responsible for channel decoding and rate dematching for data reception, a demodulator 1965, a frame demapper 1960, a sequence extractor 1975, an FFT 1955, a guard remover 1950, an analog to digital converter (ADC) 1945, an Rx antenna 1940.

According to an embodiment of the present disclosure, if data are received, at least one layer entity notifies the processor 1800 of the execution time of a function for measuring the reception time such that the processor 1800 determines the execution time of the corresponding function (message reception time) at the time measurement module 1905 and stores the time information in the memory 1910.

In the case that the RRC 1915 has to determine the time information carried in the discovery message and record the reception time, the RRC 1915 may recognize that the receive message includes time-related information based on value contained in the message type of the message, and the RCR layer 1915 notifies the execution of the RRC operation to the processor 1900, which determines the RRC operation time at the time measurement module 1905 and stores the time information as message reception time in the memory 1910.

After recoding the message reception time in the memory 1910, the processor 1900 stores the processing time of the operation before the RRC operation, e.g., a processing time of operations on the PHY layer 1935 to PDCP layer 1920, as compensation time value in the memory 1910 for use in calculating radio wave propagation time.

According to various embodiments of the present disclosure, the reception time measurement may be performed on any of the PDCP layer 1920, the RLC layer 1925, the MAC layer 1930, and the PHY layer 1935 as well as the RRC layer 1915 and, in this case, the compensation time is calculated based on the processing time of the operation before the operation time of the corresponding function.

According to an embodiment of the present disclosure, if the reception time measurement is performed based on a specific signal, it is possible to extract the corresponding signal in frequency or time domain at the sequence extraction after receiving the specific signal. The operation execution is notified to the processor 1900 only when the signal strength of the specific signal is equal to or greater than a certain threshold value and, in this case, the processor 1900 acquires the operation execution time at the time measurement module 1905 and stores the acquired operation time in the memory 1910 temporarily.

If the received discovery message is recognized as a time-related message on the layer 2, the operation time stored temporarily in the memory 1910 is recorded as reception time for use in distance calculation.

In the case that the sequence extraction operation time is stored as the reception time, the processing time of the operation before the sequence extraction operation time as a compensation time value for use in calculating the radio wave propagation time.

According to an embodiment of the present disclosure, the reception time measurement operation may be performed on any of the layer 1 or layer 1, e.g., the PDCP layer 1920, the RLC layer 1925, the MAC layer 1930, and a PHY layer 1935. The compensation time for calculating the radio wave propagation time may be the processing time of the operation before the operation time of the corresponding function.

The present disclosure is characterized in that the Tx terminal transmits to the Rx terminal a discovery message including time information for use in distance estimation or requests to the Rx terminal for the time information in the D2D discovery procedure so as to improve accuracy of measuring distance between terminals as compared to the legacy signal-based measurement method.

Unlike the signal-based distance measurement method of the related art requiring extra operation of transmitting signal information in addition to the D2D discovery operation, the proposed method is capable of transmitting the time information in the discovery message and thus there is no need of extra operation, resulting in reduction of power consumption of the terminal and improvement of radio resource utilization efficiency.

Furthermore, the present disclosure is capable of estimating the distance between terminals based on the time information useful for distance estimation in various radio communication systems so as to reduce unnecessary information search manipulation of the user.

The above enumerated components of the electronic device (e.g., a terminal) of the present disclosure may be implemented with one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to various embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and programmable-logic device known or to be developed for certain operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal operating in a wireless communication system supporting device-to-device (D2D) communication, the terminal comprising:
   a transceiver; and
   at least one processor configured to:
      synchronize the terminal with other terminals,
      control the transceiver to transmit a first time information registration request including identity information of the terminal and a transmission time of a discovery message to a server and receive a first time information registration response including time-related information from the server,
      control the transceiver to transmit the discovery message including the time-related information to the other terminals, and
      control the transceiver to receive distance information from at least one of the other terminals, the distance information being calculated based on the time-related information and a reception time of the discovery message.

2. The terminal of claim 1, wherein the at least one processor is further configured to identify the transmission time based on resources allocated to a transmission of the discovery message.

3. The terminal of claim 1,
   wherein the time-related information comprises a time-related code generated based on the transmission time of the discovery message.

4. The terminal of claim 1,
   wherein the time-related information comprises time-related code, which is generated based on a transmission time of a second time information registration request and a server processing time, and
   wherein the at least one processor is further configured to:
      start a timer for determining the server processing time,
      control the transceiver to transmit the second time information registration request including the identity information of the terminal and the transmission time of the second time information registration request to the server and to receive a second time information registration response including the time-related code from the server,
      end the timer upon receipt of the second time information registration response, and
      acquire the server processing time.

5. A terminal operating in a wireless communication system supporting device-to-device (D2D) communication, the terminal comprising:
   a transceiver;
   a time measurement device for measuring time; and
   at least one processor configured to:
      synchronize the terminal with another terminal,
      control the transceiver to receive a discovery message including time-related information from the other terminal,
      identify a reception time of the discovery message using the time measurement device,
      control the transceiver to transmit the time-related information to a server and receive a transmission time of the discovery message corresponding to the time-related information, and
      acquire distance information based on the transmission time of the discovery message and the reception time of the discovery message.

6. The terminal of claim 5,
   wherein the time-related information comprises a time-related code generated based on the transmission time of the discovery message.

7. The terminal of claim 5,
   wherein the time-related information comprises a time-related code, which is generated based on a transmission time of a time information registration request, and a server processing time, and wherein the at least one processor is further configured to control the transceiver to transmit the time-related code to the server and receive the transmission time of the time information registration request which the other terminal transmits to the server, the distance information being calculated based on the transmission time of the time information registration request, the server processing time, and the reception time of the discovery message.

8. A discovery method of a terminal in a wireless communication supporting device-to-device (D2D) communication, the method comprising:

synchronizing the terminal with other terminals;

transmit a first time information registration request including identity information of the terminal and a transmission time of a discovery message to a server and receive a first time information registration response including time-related information from the server;

transmitting the discovery message including the time-related information to the other terminals; and receiving distance information from at least one of the other terminals, the distance information being calculated based on the time-related information and a reception time of the discovery message.

9. The method of claim 8, further comprising identifying the transmission time based on resources allocated to a transmission of the discovery message.

10. The method of claim 8, wherein the time-related information comprises the time-related code generated based on the transmission time of the discovery message.

11. The method of claim 8, further comprising:

starting a timer for determining a server processing time before transmitting the discovery message;

transmitting, to a server, a second time information registration request including the identity information of the terminal and a transmission time of the time information registration request;

receiving, from the server, a second time information registration response including a time-related code generated based on the transmission time of the time information registration request;

ending the timer upon receipt of a second time information registration response; and acquiring the server processing time, wherein the time-related information comprises the time-related code and the server processing time.

12. A discovery method of a terminal in a wireless communication system supporting device-to-device (D2D) communication, the method comprising:

synchronizing the terminal with another terminal;

receiving a discovery message including time-related information from the other terminals;

identifying a reception time of the discovery message;

transmitting the time-related information to a server and receiving a transmission time of the discovery message corresponding to the time-related information, and acquiring distance information based on the transmission time of the discovery message and the reception time of the discovery message.

13. The method of claim 12, wherein the time-related information comprises the time-related code generated based on the transmission time of the discovery message.

14. The method of claim 12, further comprising:

transmitting a time-related code to the server; and receiving a transmission time of a time information registration request which another terminal transmits to the server, wherein the time-related information comprises the time-related code, which is generated based on the transmission time of the time information registration request, and a server processing time, and the distance information is calculated based on the transmission time of the time information registration request, the server processing time, and the reception time of the discovery message.

* * * * *